Jan. 19, 1960  A. CRAWLEY ET AL  2,921,322
MULTIPLE STATION BOOK PRESSING AND CREASING MACHINE
Filed June 17, 1957  13 Sheets-Sheet 1
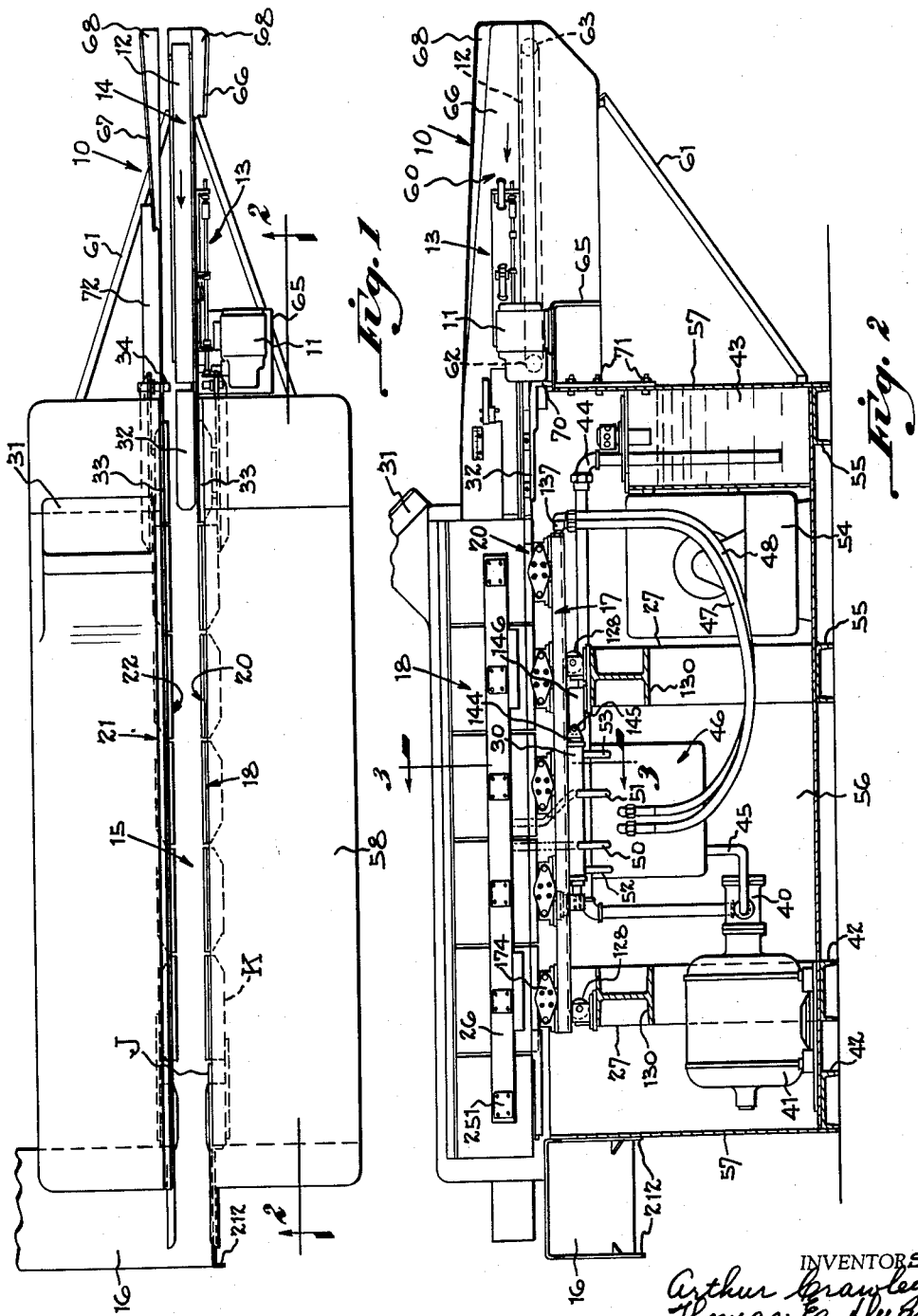

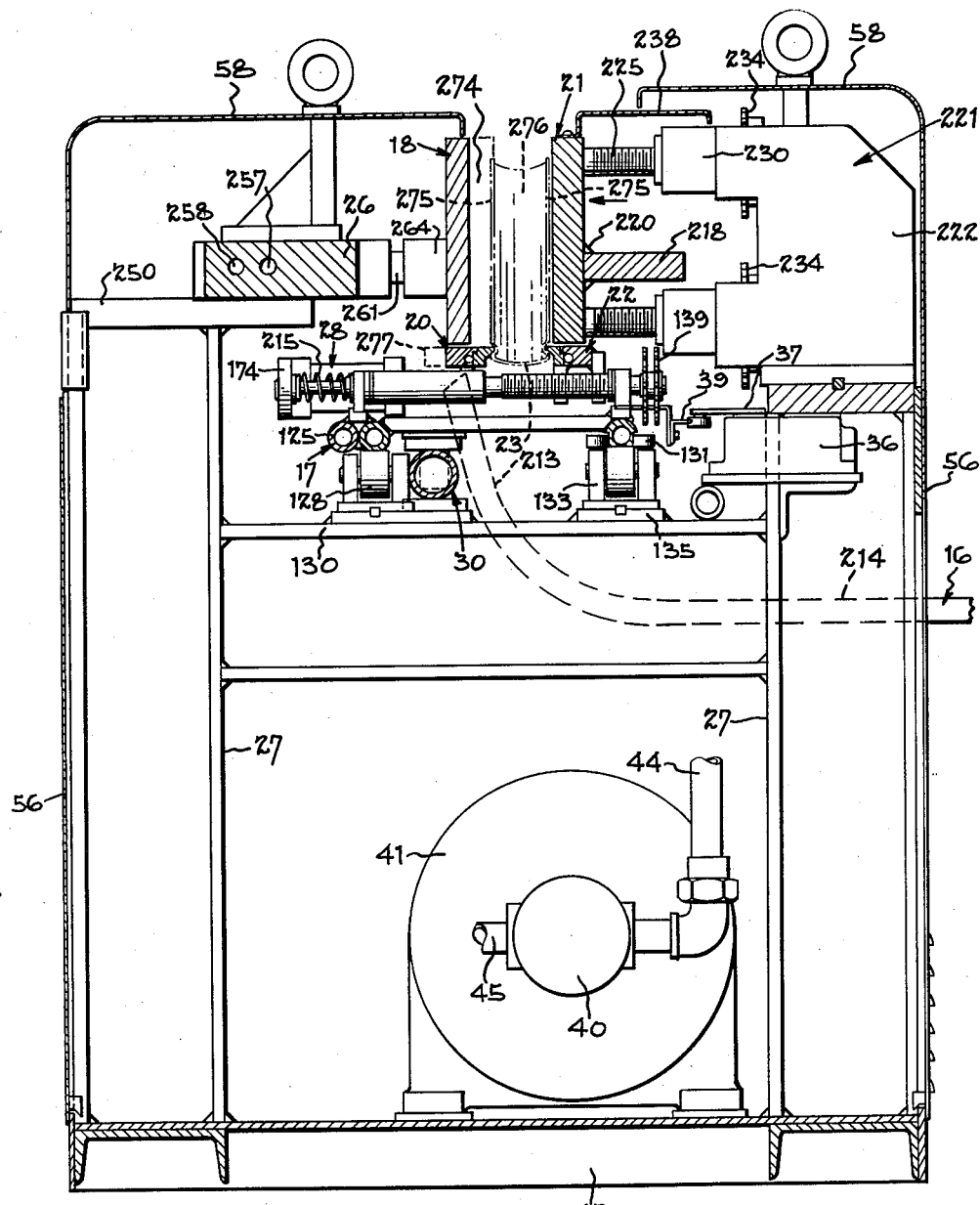

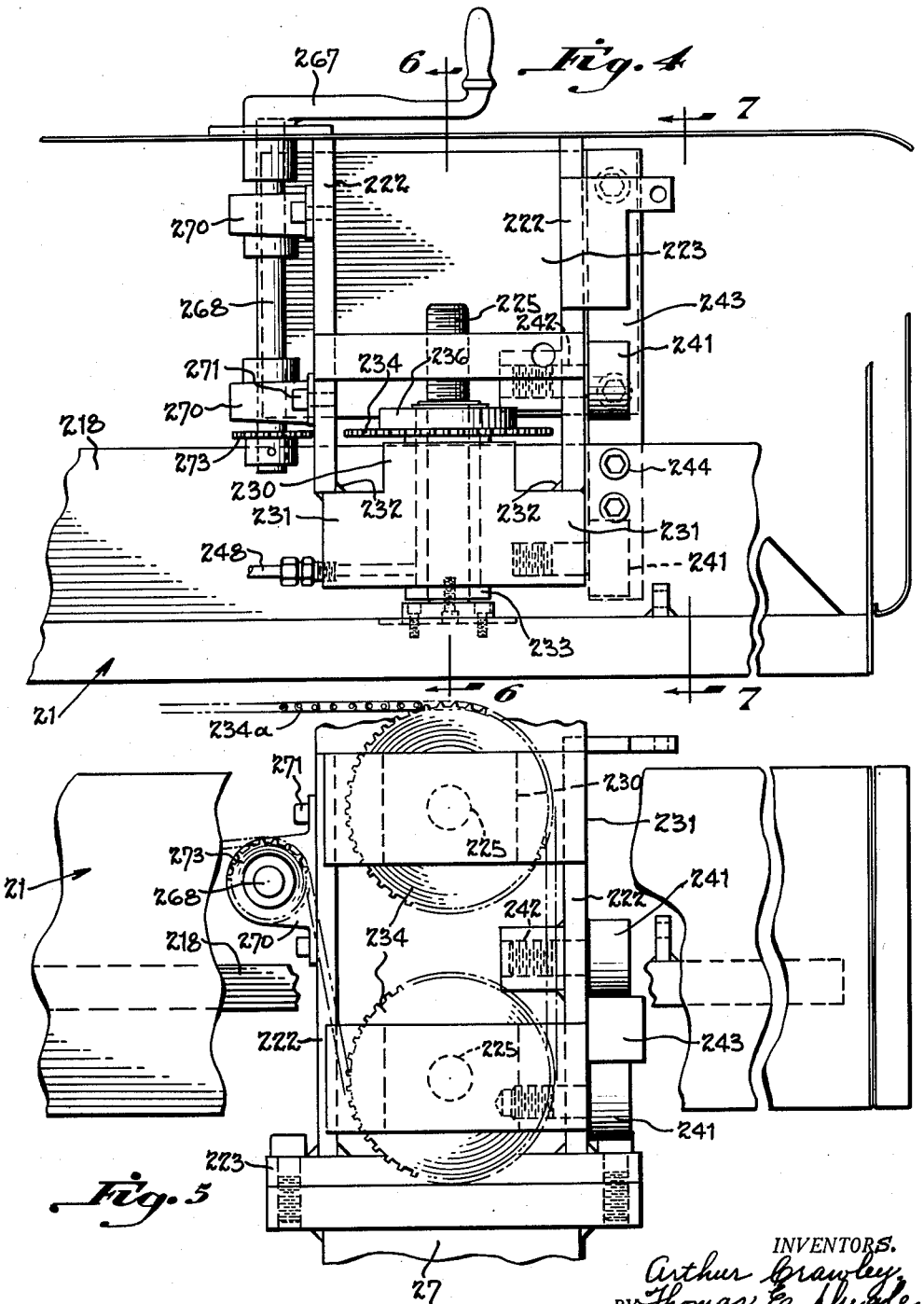

Jan. 19, 1960 A. CRAWLEY ET AL 2,921,322
MULTIPLE STATION BOOK PRESSING AND CREASING MACHINE
Filed June 17, 1957 13 Sheets-Sheet 4

INVENTORS.
Arthur Crawley.
Thomas E. Dingle.
BY Roland W. Wagner.
Wood, Herron & Evans.
ATTORNEYS.

Jan. 19, 1960 A. CRAWLEY ET AL 2,921,322
MULTIPLE STATION BOOK PRESSING AND CREASING MACHINE
Filed June 17, 1957 13 Sheets-Sheet 5

INVENTORS.
Arthur Crawley.
BY Thomas E. Dlugle.
Roland W. Wagner.
Wood, Herron & Evans.
ATTORNEYS.

Jan. 19, 1960     A. CRAWLEY ET AL     2,921,322
MULTIPLE STATION BOOK PRESSING AND CREASING MACHINE
Filed June 17, 1957     13 Sheets-Sheet 6

INVENTORS.
Arthur Crawley,
BY Thomas E. Dingle.
Roland W. Wagner.
Wood, Herron & Evans.
ATTORNEYS.

Jan. 19, 1960 A. CRAWLEY ET AL 2,921,322
MULTIPLE STATION BOOK PRESSING AND CREASING MACHINE
Filed June 17, 1957 13 Sheets-Sheet 7

INVENTORS.
Arthur Crawley.
Thomas E. Hugle.
BY Roland W. Wagner.
Wood, Herron & Evans.
ATTORNEYS.

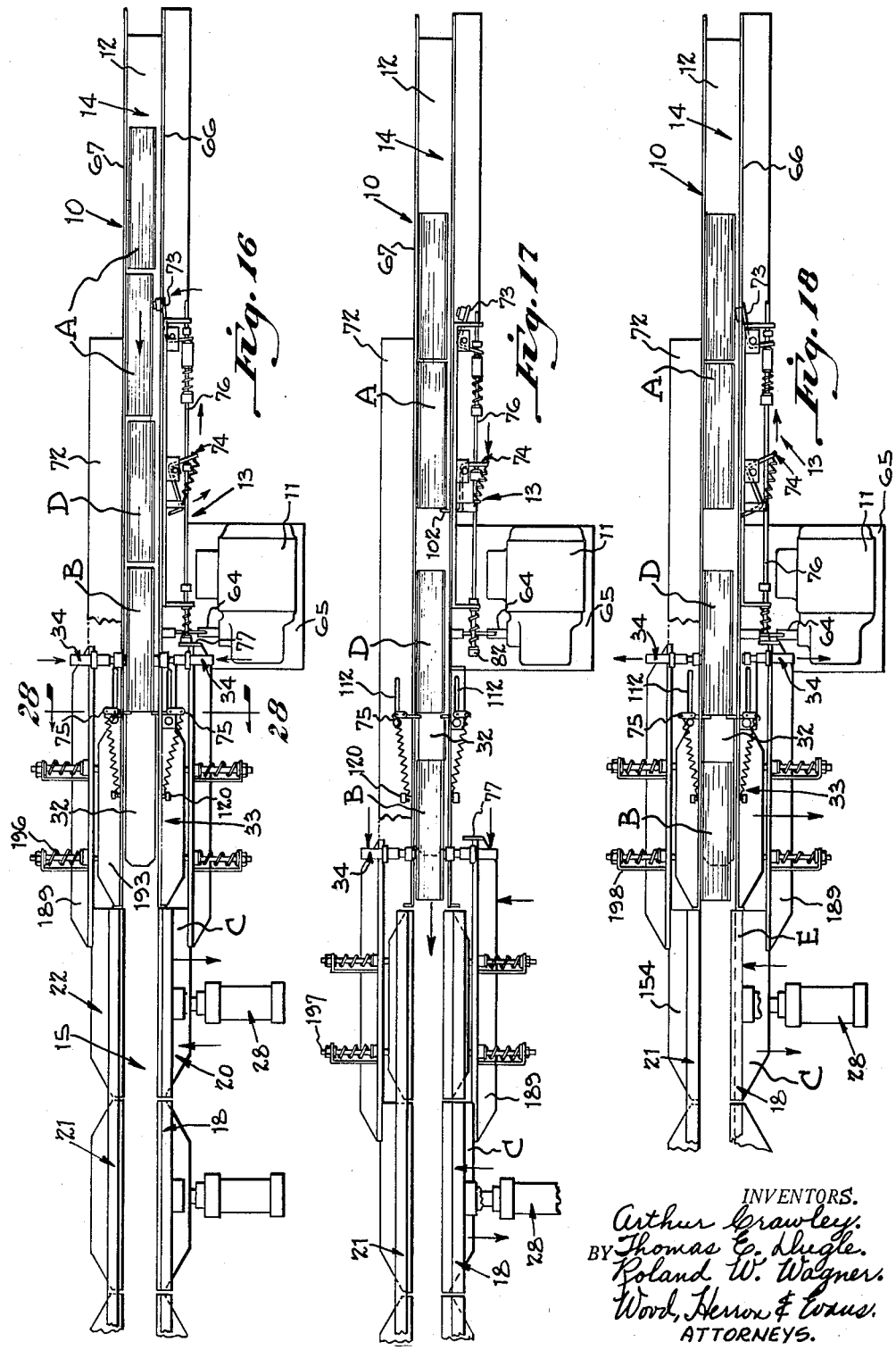

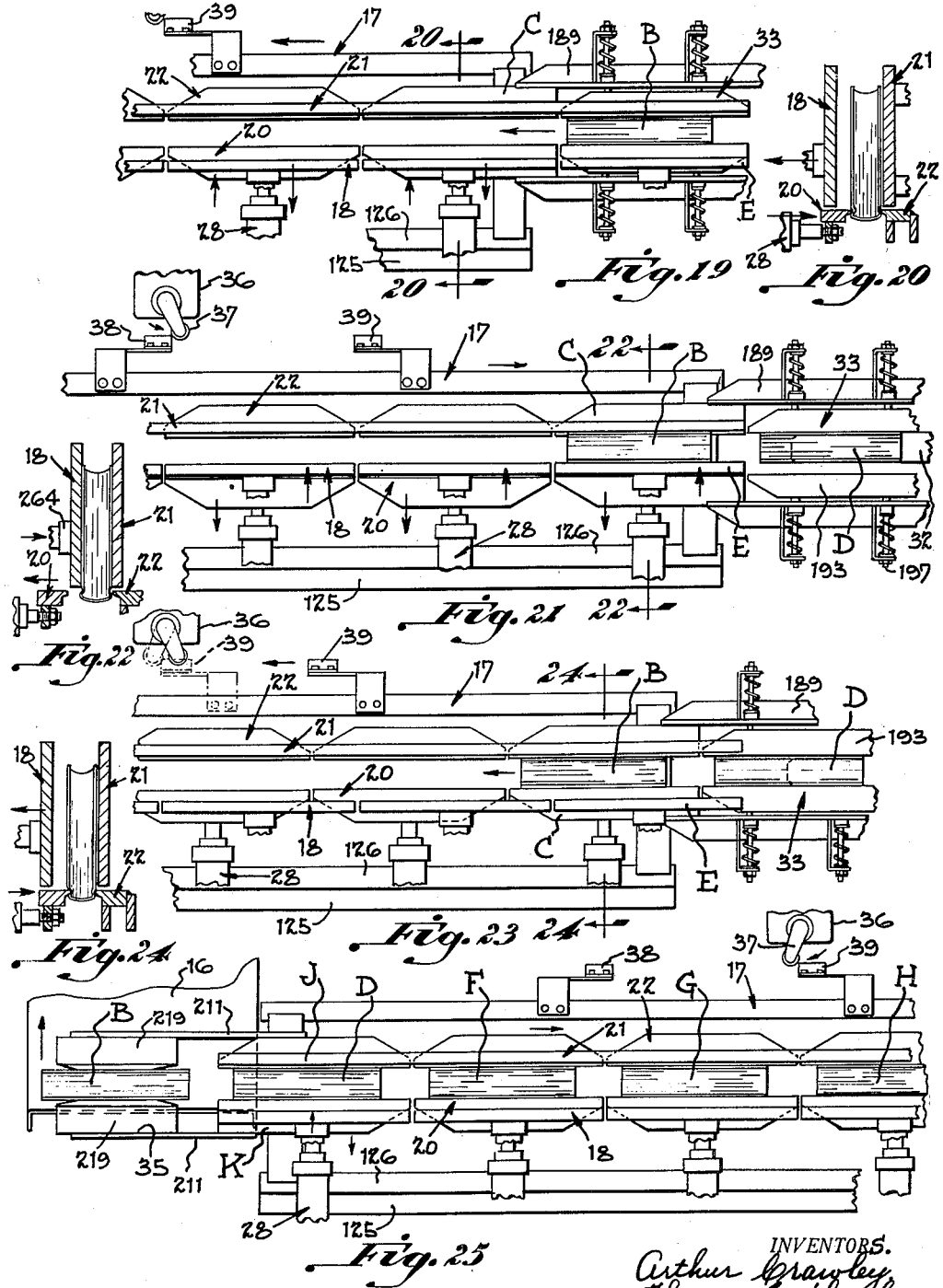

Jan. 19, 1960
A. CRAWLEY ET AL
2,921,322
MULTIPLE STATION BOOK PRESSING AND CREASING MACHINE
Filed June 17, 1957
13 Sheets-Sheet 10
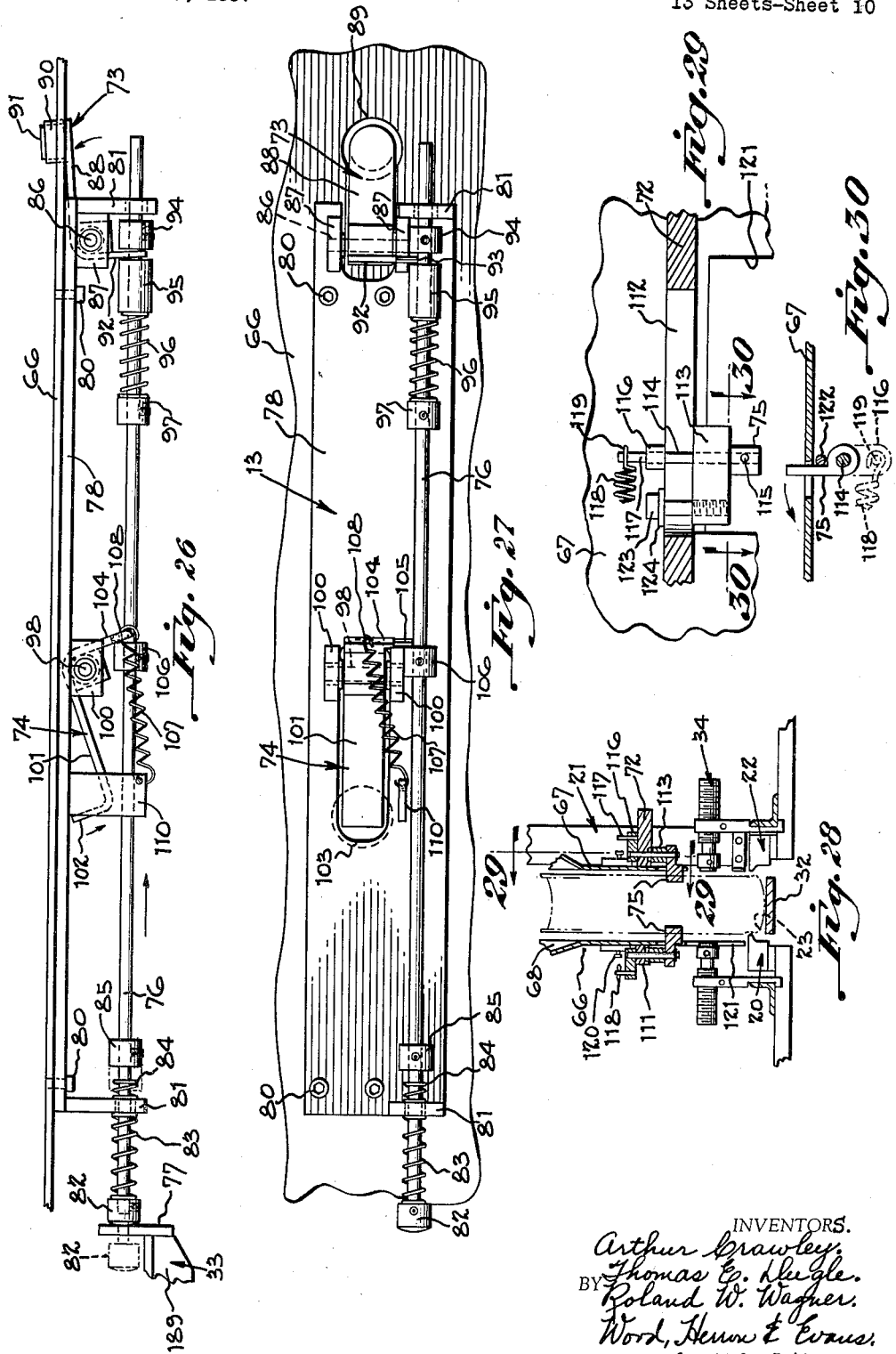
INVENTORS.
Arthur Crawley,
BY Thomas E. Dergle.
Roland W. Wagner.
Wood, Herron & Evans,
ATTORNEYS.

Jan. 19, 1960 A. CRAWLEY ET AL 2,921,322
MULTIPLE STATION BOOK PRESSING AND CREASING MACHINE
Filed June 17, 1957 13 Sheets-Sheet 11

INVENTORS.
Arthur Crawley.
Thomas E. Dugle.
BY Roland W. Wagner.
Wood, Herron & Evans.
ATTORNEYS.

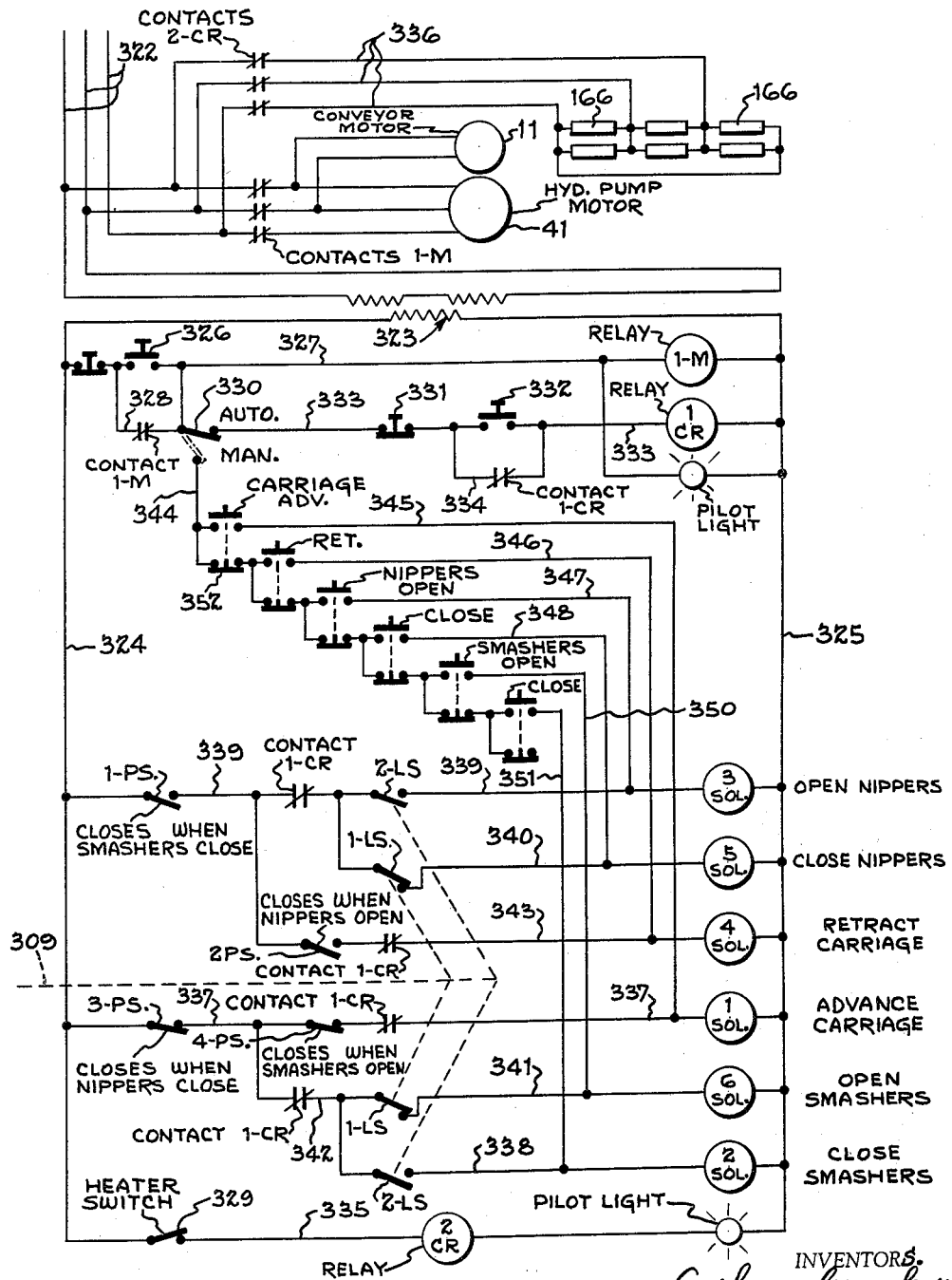
Fig. 3.3

United States Patent Office  2,921,322
Patented Jan. 19, 1960

2,921,322

MULTIPLE STATION BOOK PRESSING AND CREASING MACHINE

Arthur Crawley and Thomas E. Dugle, Cincinnati, and Roland W. Wagner, Sharonville, Ohio, assignors to Crawley Machinery Company, Inc., Newtown, Ohio, a corporation of Ohio Application June 17, 1957, Serial No. 665,912

19 Claims. (Cl. 11—1)

This invention relates to an automatic machine for creasing and pressing books in a continuous stream after the book fillers have been inserted into the covers, with wet adhesive applied to the meeting surfaces of the fillers and covers.

In the manufacture of books, each page block or filler is assembled by stitching or the like as one unit, and each book cover is fabricated as a separate unit. The fillers and covers are then assembled, the filler being slipped into the cover with the wet adhesive applied to the meeting surfaces. In order to create a good adhesive bond and to flatten the freshly pasted covers and fillers, the assembled books are held under pressure between flat surfaces for a drying period. In order to form the hinge lines or joints along the rounded ends of the books, pressure is applied along the joint lines. This creasing or nipping pressure also draws the rounded connecting section of the covers firmly into contact with the rounded end of the filler to provide a good adhesive bond in this area.

In the past, the conventional practice was to press and crease the books between press boards, each having one or more ridges or ribs projecting from its surface. According to this method, the freshly glued books are placed between pairs of press boards with the ribs extending along the covers adjacent the rounded ends, with pressure applied to the press boards. Accordingly, the ridges impress the crease lines when the boards press the covers against the fillers. The books are allowed to remain between the boards for a period of time sufficient to allow the adhesive to dry.

More recently, the book binding industry has turned to various types of power-operated machines which perform pressing and creasing operations rapidly by subjecting each book to a series of pressing and creasing operations during passage of a stream of books continuously, or in stepwise advancement, through the machine. In general, such a machine may comprise pairs of flat pressing plates or smashers arranged to create a longitudinal passageway, pairs of related creaser or nipper jaws associated with the smashers, actuating means for intermittently opening and closing the smashers and nippers, and book conveyor or feed means for advancing the stream of books in stepwise progression from one station to the next when the smashers and nippers intermittently are open. The books are thus pressed and creased when the smashers and nippers close, the feed means being intermittently inactive during these periods.

One of the primary objectives of the present invention has been to provide a machine of this general character, but which is greatly simplified by utilizing the nippers for the double function of creasing the books and also for advancing them in stepwise progression from one smasher station to the next, thus eliminating the book feeding mechanism which was necessary in the past.

A machine utilizing this principle in general comprises pairs of opposed pressed plates or smashers spaced transversely from one another and delineating a longitudinal book passage, the smashers being movable transversely relative to one another so as to engage under pressure a row of books which are advanced stepwisely through the passageway. Respective pairs of creaser jaws or nippers, spaced from one another transversely, reside along the edges of the smashers and are mounted upon a carriage which is reciprocated longitudinally in forward and reverse directions, such that the nippers move longitudinally relative to the smashers. The nippers on the carriage also move transversely so as to grip the books along their crease lines and impress the joints at opposite sides adjacent the rounded ends of the books.

During a point in the cycle when the carriage shifts to a loading position, the pair of nippers at one end of the carriage is advanced beyond the receiving end of the longitudinal passageway, all of the nippers being open and the smashers closed at this point. A freshly pasted and assembled book is advanced to a position between the first pair of open nippers, the nippers then close and the smashers open; next, the carriage is shifted longitudinally toward the unloading end of the passageway, thus carrying the fresh book to the first set of smashers. The stroke of the carriage is equal to the longitudinal spacing of the pairs of smashers which delineate the longitudinal passageway, such that the row of books is advanced by the nippers in unison from one pair of smashers to the next upon motion toward the unloading position.

The carriage dwells momentarily in the unloading position with the nippers gripping the book and with the smashers open, then the smashers close under pressure to smash the books. Thereafter, the nippers open, then the carriage shifts back to the loading end of the passageway to pick up the next freshly pasted book while the books in the passageway dwell in pressure engagement between the closed smashers.

Briefly therefore, during sustained reciprocation of the carriage and timed alternate opening and closing of the smashers and nippers, each book is subjected alternately to a creasing and smashing treatment, a fresh book being fed into the machine upon each stroke to the loading end and a finished book being discharged upon each stroke to the unloading end. The finished book drops by gravity from the last set of nippers or delivery jaws when the nippers open at the unloading end prior to being shifted with the carriage back to the loading position. It has been found in practice, that the alternate nipping and smashing operations, utilizing the nippers to impress the joints and also as book feeding means, not only simplifies the structure, but improves the quality of the finished product.

Another objective has been to simplify the machine by utilizing a fluid pressure system having respective cylinders for reciprocating the carriage longitudinally and for opening and closing the nippers and smashers in time with the carriage reciprocations.

Briefly, the fluid pressure system is controlled by limit devices, in the present example, limit switches, which are actuated by the carriage at the limits of its travel. In its loading position (with the smashers closed), the carriage limit switches first cause the nippers to close; when the nippers are fully closed under pressure, back pressure of the nipper cylinders causes the smashers to open. When the smashers are fully opened, back pressure from the smasher cylinders causes the carriage to travel to its unloading position.

At the unloading position (with the smashers open and the nippers closed), the carriage limit device causes the smashers to close and when predetermined smashing pressure is obtained, back pressure from the smasher cylinder causes the nippers to open. At this point, back pressure from the nipper cylinders causes the carriage to travel back to its loading position with the nippers open to repeat the cycle. The fluid pressure system provides sustained reciprocation of the carriage and timed opening and closing of the smashers and nippers, thus causing a continuous stream of books to be advanced stepwisely through the machine.

A further advantage of the fluid pressure system arises from the fact that the smashing and nipping pressures are conveniently regulated to suit the requirements of different types of books by means of adjustable pressure-regulating valves which by-pass the fluid pressure at predetermined setting. To control the rate of reciprocation of the carriage and hence the duration of the treatment periods, metering valves are interposed in the fluid conduits leading to the carriage cylinder. These valves regulate the carriage velocity in both directions of movement in accordance with the requirements of various types of books.

In order to properly impress the joints and dry the adhesive rapidly, the nipper jaws preferably are heated electrically, the temperature being regulated to suit the books by conventional means; accordingly, the nippers apply heat and pressure to the joints. The smashers preferably operate at room temperature, although they also may be heated if required.

To create creases or joints having various characteristics, the nippers are provided with detachable jaw inserts having working edges which are profiled to impress the required crease profile. The jaw inserts are detachably but firmly held in position by yieldable springs which permit them to be demounted for interchange in a rapid convenient manner.

In the preferred structure disclosed herein, which is selected to illustrate the principles of this invention, the nippers and their actuating cylinders each comprise a self-contained unit mounted on the carriage, the structure being such that the pressure developed by the nipper jaw is isolated from the carriage. Accordingly, the carriage constitutes a relatively light weight framework reducing the momentum effect at its limits of reciprocation, making it possible to reciprocate the carriage at a rapid rate. To impress the creases or joints to equal depth along opposite sides, the opposed nippers are free to float transversely relative to the smashers at the points in the cycle when the book is engaged both by the smashers and nippers.

A further objective of the invention has been to provide a simple feed mechanism at the loading end of the machine, such that the freshly pasted books may be advanced at random to be segregated and picked up by the loading nippers at the receiving end of the carriage.

This mechanism in general, comprises a continuously advancing conveyor, preferably of the belt type, which advances a solid row of freshly pasted books with the books resting upon their rounded ends, such that the fillers settle naturally by gravity into the covers while resting upon the conveyor. A transfer or feed mechanism at the downstream end of the conveyor arrests the solid row of books. The feed mechanism includes a release device which is engaged by the carriage in its loading position, causing an individual book to be released from the solid row. The released book then is advanced by the conveyor to yieldable stop means where it is arrested in a predetermined longitudinal position subsequently to be advanced to the first smasher station.

For this purpose, the carriage includes a pair of withdrawal plungers mounted on its upstream end. In the loading position, these plungers are aligned with the segregated book residing against the yieldable stop means; when the nippers close, the plungers frictionally engage the book and upon a longitudinal carriage motion to the unloading postion, the plungers withdraw the book from the yieldable stop means, then release it in position to be engaged by the first pair of nippers at the receiving end of the carriage. Upon the next cycle, the first set of nippers, which constitute loading jaws, close upon the book and carry it to the first smasher station; thereafter, the book and subsequent books are advanced through the machine during each cycle.

The present machine is intended for books of any thickness, and for this purpose, both the opposed smashers and nippers may be shifted transversely to vary their spacing in accordance with book thickness, adjusting mechanism being provided for this purpose. In setting up the machine, the smashers and nippers are shifted to their open positions, the fluid pressure system having manual control means for this purpose. The adjustment mechanism is then actuated to shift the smashers and nippers transversely to a spacing somewhat greater than the thickness of the book. After this adjustment is made, a switch of the control system is shifted to provide automatic operation, each book thereafter being pressed and creased under uniform pre-selected pressure during the successive operating cycles.

Various other features and advantages of the invention will be more fully apparent to those skilled in the art from the following detailed description taken in conjunction with the drawings.

In the drawings:

Figure 1 is a general top plan view of the complete machine, including the feed mechanism at its receiving end.

Figure 2 is a general side elevation as projected from Figure 1, with the casing of the machine partially removed to expose certain internal components.

Figure 3 is a sectional view taken along line 3—3 of Figure 2, illustrating the smasher and creaser mechanism generally.

Figure 4 is a fragmentary top plan view of a portion of the machine at the loading end, showing the mechanism for adjusting the smasher spacing.

Figure 5 is a side view projected from Figure 4, further illustrating the smasher adjusting mechanism.

Figures 16 to 19 are diagrammatic views showing the operation of the book feeding and loading mechanism at the loading end of the carriage.

Figure 20 is a sectional view taken on line 20—20 of Figure 19, showing the smashers and loading nippers in relation to a book in positions corresponding to Figure 19.

Figure 21 is a view similar to Figure 19, showing the book being advanced into the first smasher station.

Figure 22 is a sectional view taken along line 22—22 of Figure 21.

Figure 23 is a diagrammatic view similar to Figure 21, showing further advancement of the parts.

Figure 24 is a sectional view taken along line 24—24 of Figure 23.

Figure 25 is a diagrammatic view similar to Figure 23, but showing the unloading or discharge end of the machine.

Figure 26 is a fragmentary top plan view showing the conveyor feed mechanism on an enlarged scale.

Figure 27 is a side elevation of the feed mechanism, as projected from Figure 26.

Figure 28 is an enlarged sectional view taken along line 28—28 of Figure 16, detailing the yieldable stop fingers of the feed mechanism.

Figure 29 is a sectional view taken along line 29—29 of Figure 28, further detailing the adjustable mounting of the yieldable stop fingers.

Figure 30 is a sectional view taken along line 30—30 of Figure 29, illustrating the stop element in relation to the side plate of the conveyor.

Figure 33 is a diagrammatic view further illustrating the electrical circuit which coacts with the hydraulic apparatus.

*Structure generally*

Figure 6:
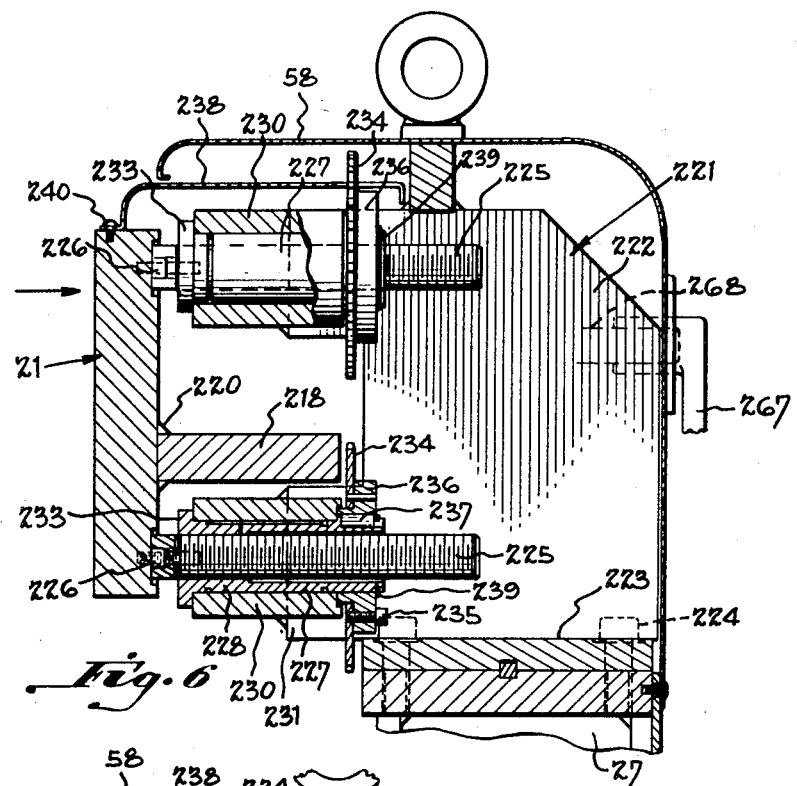
Figure 6 is an enlarged sectional view taken along line 6—6 of Figure 4, detailing the adjustable mounting of the continuous presser plate or smashers.
Figure 7:
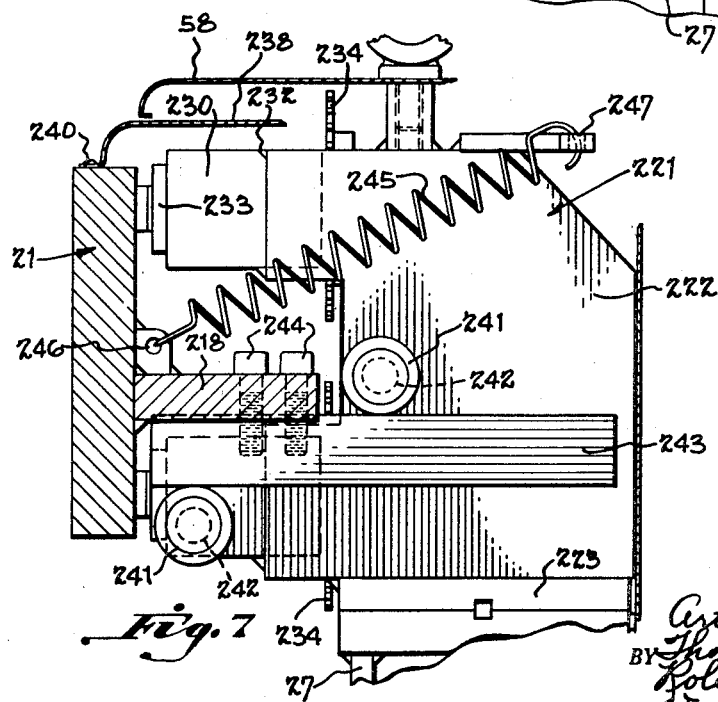
Figure 7 is a sectional view taken along line 7—7 of Figure 4, further illustrating the continuous smasher and its backlash take-up spring.

Described generally with reference to Figures 1 and 2, the machine includes a loading conveyor 10 at its receiving or in-feed end which advances the books individually into the creasing and pressing machine. The conveyor is driven by a motor 11 of the gear-head type, which advances a conveyor belt 12 continuously in the direction indicated by the arrow in Figure 2. The conveyor 10 operates independently of the machine; however, the conveyor includes a feed control or transfer mechanism 13 interconnected with the pressing and creasing mechanism and arranged to release the books individually for stepwise advancement through the machine.

While the machine is in operation, the freshly glued and assembled books are advanced continuously to the conveyor by an operator, or by conveyor means, the books being placed in the longitudinal passageway 14 above the conveyor belt 12, the rounded ends of the books resting upon the conveyor belt and being loosely confined in a vertical plane within the passageway 14. The advancing belt 12 thus frictionally engages the row of books resting upon it, and advances them toward the machine. As they approach the machine, they are arrested by the feed control mechanism 13 which causes the books to be reformed into a solid row. Upon each operating cycle of the machine, the feed control mechanism 13 releases one book from the downstream end of the solid row, the books then being advanced through the successive pressing and creasing stations which reside along the longitudinal passageway 15, as viewed in Figure 1. Upon reaching the downstream end of passageway 15, the finished books are delivered to a discharge chute 16 which causes them to slide by gravity to a delivery point; from this point, the finished books are ready for packaging or shipment.

The machine illustrated in Figures 1 and 2, is provided with six pressing or smashing stations, the books being advanced longitudinally by creaser jaws or nippers which are carried on a longitudinally movable carriage indicated at 17 in Figure 2. It will be noted in this view, that the six stations are delineated by the six presser plates or smashers 18 which reside in a common vertical plane along one side of passageway 15 above the carriage 17. As shown in Figure 2, a series of creaser jaws or nippers 20 are mounted upon the carriage and are movable longitudinally with the carriage and also transversely under hydraulic pressure. The nippers 20 reside immediately below the lower endge of the smasher 18. The carriage is shown in Figures 1 and 2 in a loading position advanced toward the transfer mechanism, at which point the nippers or creaser jaws are in alignment with the smashers or presser plates 18.

As viewed from above in Figure 1, the smashers 18 reside along one side of passageway 15, and a continuous stationary presser plate 21 extends along the opposite side of the passageway. The carriage 17 is provided with companion nippers or creaser jaws 22 which oppose the nippers 20, the nippers 22 residing beneath the stationary presser plate 21 and moving longitudinally with carriage 17 and nippers 20.

The width of the passageway 15 may be increased or decreased to accommodate the thickness of the books being processed, the machine being provided with an adjusting mechanism which is operated by two hand cranks as described in detail later. Operation of the cranks causes the continuous presser plate 21 and the nippers 22 to be shifted transversely toward or away from the opposed smashers 18 and companion nippers 20.

During the operating cycles, the smashers 18 are shifted transversely toward and away from the stationary presser plate 21 by respective hydraulic pistons 24 which reciprocate within cylinder bores 25, the respective cylinder bores 25 being machined directly through an elongated cylinder block 26 (Figures 8 and 9) which extends in parallelism with the smashers 18. As shown in Figure 2, cylinder block 26 is mounted rigidly upon a pair of standards 27—27 which form a part of the machine frame. The stationary presser plate 21 is carried by similar standards 27 as described later (Figure 3), the arrangement being such that the books are compressed under pressure between the stationary plate 21 and movable smasher 18 when fluid pressure is applied to the cylinders 25.

Figure 14:
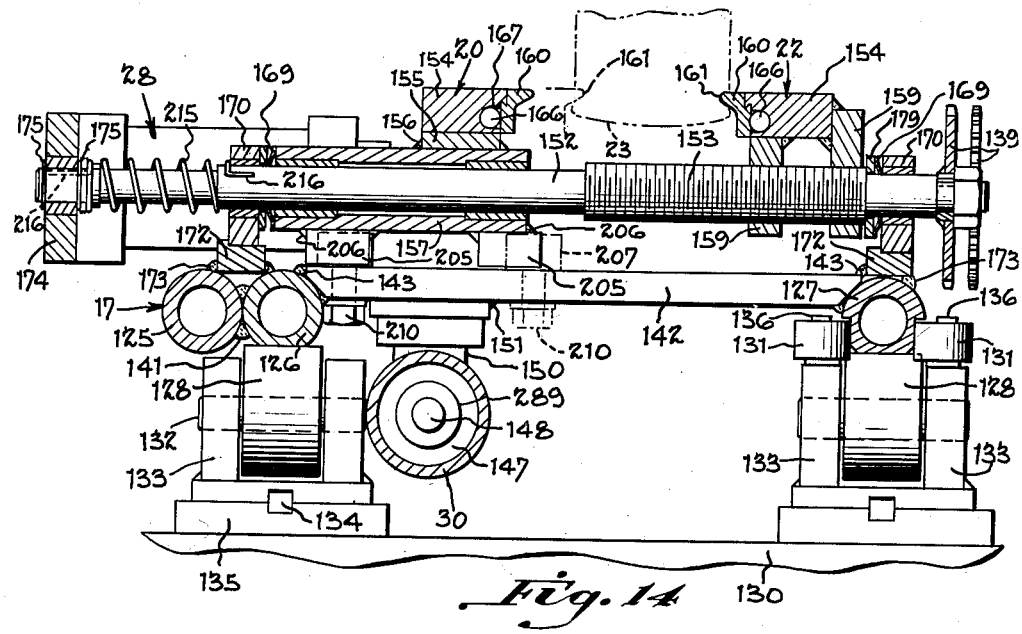
Figure 14 is an enlarged sectional view taken along line 14—14 of Figure 10, detailing the carriage and nipper construction.

The nippers 20 are shifted transversely relative to the opposed nippers 22 by respective nipper cylinders 28 which are attached rigidly to the carriage 17 as shown in Figure 14. As explained later in detail, each pair of nippers 20 and 22 is mounted upon a self-contained structure which operates the nippers independently of the smashers, each pair of opposed jaws being free to float transversely, within limits, relative to the smashers. After the smashers have engaged the book under pressure from opposite sides, the nippers move toward one another and engage the crease of the book; by virtue of their transverse floating action, they apply equalized pressure upon the crease lines or joints, thereby impressing the crease lines to an equal depth along opposite sides.

The carriage 17 is shifted longitudinally by a carriage cylinder 30 having one end connected to the frame of the machine and having a piston in driving connection with the carriage. The carriage piston is reciprocated in time with the operation of the smashers and nippers, a hydraulic control system, as later described, being in communication with the opposite ends of the several cylinders to provide timed cyclic operation. The valves and other components of the hydraulic system are operated electrically in proper sequence by an electrical circuit which is described later. The electrical circuit is regulated by push button switches which are carried by a control panel 31 located at the infeed end of the machine as shown in Figures 1 and 2. The switches and other components of the panel are shown diagrammatically in Figures 32 and 33 and are described later.

As noted earlier, the nippers 20 and 22 have the double function of impressing the joints adjacent the rounded ends of the books and also of advancing the books in stepwise fashion along the passageway 15 from one smasher station 18 to the next for the sequential pressing operations. The machine repeats its cycles rapidly, such that a continuous stream of books advances in steps through the machine, as indicated in Figure 25, each book in the stream being subjected individually to the repeated creasing and pressing treatments before being delivered to the discharge chute 16 in finished condition.

Operation

The cycle may be described briefly as starting with the carriage in its retracted or loading position adjacent the transfer mechanism 13, with the nippers 20 closed and engaging the joints of the books (Figures 1 and 2). At this point in the cycle, the smashers 18 are open and the carriage dwells momentarily in the loading position, then the carriage advances and shifts the nippers (and books) longitudinally toward the discharge end of the machine, the length of the stroke being equal to the longitudinal center-to-center spacing of the smashers 18. At the limit of this stroke, the books will have been advanced collectively by the nippers to the next smasher in the downstream direction. At this downstream point, the carriage again pauses momentarily, the smasher close, then the nippers open to release the books which are now engaged under pressure by the smashers. The carriage now returns to its loading position at the transfer mechanism with the nippers open to repeat the cycle.

It will be understood at this point that, upon each cycle, an unfinished book is advanced to the first smasher station at the infeed end of the machine, and a finished book is released to the delivery chute 16 at the discharge end. The operation of the transfer mechanism 13 is described later in detail; however, it will be understood that an unfinished book is advanced from the transfer mechanism to a stationary support plate 32 during travel of the carriage from its loading position. The support plate holds the book, which is resting upon its rounded end 23 (Figure 28) at the horizontal plane which locates its creases with respect to the nippers (Figure 28). It will also be understood that the book is advanced longitudinally to a position on the support plate which spaces it the proper distance longitudinally from the first smasher station. In other words, the longitudinal center of the book on the support plate 32 is spaced from the center of the first smasher station a distance substantially equal to the stroke of the carriage. Accordingly, the book will be advanced from the support plate 32 to a proper position at the first and subsequent smasher stations, the longitudinal stroke of the carriage and nippers being equal to the center-to-center spacing of the smasher stations, as noted above.

It will be remembered that the nipper cylinders 28 are mounted rigidly on the carriage and that the nippers 20 and 22 form a self-contained unit moving longitudinally with the carriage. Hydraulic fluid is supplied and exhausted with respect to the nipper cylinders 28 by flexible hydraulic conduits which are connected to the carriage and extend from a hydraulic system, as described later. The entire carriage assembly is thus free to reciprocate longitudinally relative to the smasher stations without interference.

In the present example, the machine presses and creases the books at the rate of approximately 35 books per minute in an intermittent stream. It will be seen that a substantial savings in mechanism is effected by the utilization of the nippers as book conveyor means, since the six books within the machine are creased while they are being advanced from station to station. Since the pressing operation takes place while the carriage is advancing toward the infeed end of the machine, the creasing and smashing operations are carried out alternately instead of simultaneously; this is formed to improve the quality of the finished product.

The operating cycles, including the initial loading step, may be described more explicitly with reference to Figures 16 to 25. In order to clarify the disclosure, these views show the machine completely unloaded of books, for example, at the start of a day's run. Figure 16 shows the carriage at its loading position, corresponding to Figures 1 and 2, with the nippers closed and the smashers open. A row of books, indicated at A, is shown on conveyor 10, the first book of the row, which is indicated at B, being arrested at the downstream end of the conveyor by the feed control mechanism 13. In order to withdraw the book B from the feed control mechanism 13 into the machine, the first set of nippers, indicated at C, includes a pair of yieldable loading jaws or nippers 33 attached to and movable longitudinally and transversely with the first set of nippers C. The upstream end of the loading nippers 33 include a pair of withdrawal plungers 34.

In the position shown in Figure 16, the loading nippers 33 and withdrawal plungers 34 are in pick-up position, the nippers 20 being closed and the smashers 18 being open during the dwell period, as noted above. At the end of the dwell period, with the nippers closed, withdrawal plungers 34 are in engagement with book B against opposite sides, then the carriage is shifted longitudinally from its loading position downstream toward the delivery end of the machine. This motion causes the first book B to be withdrawn from feed mechanism 13 and transferred to its pick-up position on support plate 32, as indicated by the arrows in Figure 17. It will be noted at this view, that the longitudinal withdrawal motion of book B is equal to the longitudinal stroke of the carriage, as explained above.

At the end of the downstream dwell period (Figure 17), the smashers close and the nippers open, then the carriage returns upstream to its loading position, as shown in Figure 18. This view shows the parts in the dwell period similar to that shown in Figure 16, but with the smashers closed, and with the yieldable nippers 33 and withdrawal plungers 34 in open position as indicated by the arrows. It will be noted in Figure 18, that a second book, indicated at D, has been advanced by the feed mechanism 13 from the row of books A in position to be engaged by the withdrawal plungers 34. The book B previously advanced to plate 32 by the plungers 34 is in position to be engaged by the open loading nippers 33 in Figure 18.

At the end of the upstream dwell period (Figure 18), the smashers open and the nippers close, then the carriage shifts to its downstream limit as indicated by the arrows in Figures 19 and 20. This advances the first book B to the first smasher station which is indicated at E. The parts are shown in Figures 19 and 20 at the downstream dwell period, with the smashers open and the nippers closed as indicated by the arrows.

At the end of the downstream dwell, the smashers close and the nippers open, then the carriage returns to its upstream loading position to pick up the book D, which is now resting upon support plate 32, as shown in Figures 21 and 22. Thereafter, the nippers close, the smashers open and the second book D is advanced toward the first smasher station E while book B is engaged by the first set of nippers C for advancement to the second smasher station (Figures 23 and 24).

The sustained longitudinal reciprocation of the carriage with the nippers open during upstream movement and closed during downstream motion, combined with the alternate opening and closing of the smashers, thus advances the books B and D, and subsequent books F, G and H (Figure 25) simultaneously in steps from one smasher station to the next. Accordingly, each book is subjected to six pressing and creasing operations before reaching the delivery chute 16. The finished books are transferred from the last smasher station J by a pair of unloading jaws indicated at 35 in Figure 25. These jaws are attached to the last pair of nippers indicated at K and move with the carriage from the position shown in Figure 1 to the position of Figure 25, carrying book B (and subsequent books) from the last smasher station J to a position above discharge chute 16, where it is released. At the end of the dwell period shown in Figure 25, jaws 35 open with the nippers K, causing the book B to drop to the delivery chute 16.

As shown diagrammatically in Figures 21, 23 and 24, the stroke of the carriage is regulated by a limit switch 36 having an arm 37 which is actuated by a pair of dogs 38 and 39 mounted on the carriage. At the limit of carriage movement upstream toward the infeed end of the machine, as shown in Figure 21, dog 38 trips arm 37, and at the limit of travel in the downstream direction, dog 39 trips the arm to the opposite position as indicated in broken lines in Figure 23, and in full lines in Figure 25. The longitudinal spacing of the dogs 38 and 39, plus the throw of arm 37 from one position to the other, determines the length of the carriage stroke. The limit switch structure is shown in greater detail in Figure 3.

As shown generally in Figure 2, the nippers, smashers and carriage are actuated by a hydraulic pump 40 driven by the main motor 41 which is mounted upon transverse channel members 42 of the machine frame. A reservoir or sump 43 supplies hydraulic liquid to the pump by way of the intake conduit 44. Fluid under pressure is delivered from pump 40 by way of conduit 45 to the hydraulic control system which is indicated diagrammatically at 46. The electrically operated valves and other components of the hydraulic system are contained in the control unit 46. The valves and other components of the control unit are electrically actuated in response to the operation of limit switch 36 by the carriage. The limit switch is interconnected in the electrical control circuit for this propose as explained later.

From the control system 46, hydraulic fluid is conducted to and from the nipper cylinders by way of the conduits 47 and 48. These conduits communicate with the carriage, which acts as a manifold, the individual nippper cylinders 28 being in communication with the conduits by way of branch conduits as explained later. It will be understood at this point, that the conduits 47 and 48 are of flexible material to allow the carriage 17 to reciprocate without interference.

The smasher cylinder bores 25 of cylinder block 26 are in communication with the conduits 50 and 51 which extend from the unit 46 to cylinder block 26. The cylinder block is provided with longitudinal bores communicating with the conduits 50 and 51 as explained later. The longitudinal bores are connected to the opposite ends of the smasher cylinders by way of branch passageways within block 26.

The carriage cylinder 30 is connected to the unit 46 by way of conduits 52 and 53. The main motor 41 runs continuously while the machine is in operation, the hydraulic system 46 being provided with the usual by-pass means and pressure accumulators. The machine further is provided with an oil cooler indicated at 54. Since the oil cooler and pump are conventional, this structure has been omitted from the disclosure.

The frame of the machine is fabricated from heavy structural members such as I-beams and channels, the frame structure being supported by the channel 42 which supports the motor and by additional channels indicated at 55, all resting upon the floor. The frame and the components which it supports are enclosed by side walls 56, end walls 57 and a top panel 58 all formed of sheet metal appropriately joined together and attached to the framework.

As explained later in detail, fluid pressure is applied to the smasher cylinders 25, nipper cylinders 28 and carriage cylinder 30 in proper sequence to provide the timed operation of these components. When the carriage cylinder 30 advances the carriage upstream to its loading position (Figure 16) and trips switch 36, the hydraulic control system directs fluid pressure to the smasher cylinders 25 to cause the smashers 18 to open. The sequence of operations was described above, starting with the smashers open and the nippers closed. When fully opened, the smasher pistons engage positive stops, causing back pressure to be developed in the smasher cylinders 25.

The hydraulic system includes a first pressure-responsive switch which is acted upon by this back pressure to cause fluid pressure to be directed to the nipper cylinders 28 in a direction to close the nippers. During this phase, fluid pressure is supplied to the carriage cylinder to hold the carriage in its stationary upstream loading position. After the nippers close in response to the opening of the smashers, predetermined back pressure from the nipper cylinders 28 trips a second pressure-responsive switch. This second switch, upon being tripped, causes the hydraulic system to direct fluid pressure to the carriage cylinder 30, causing the cylinder to shift the carriage downstream from its loading position, causing dog 39 to trip switch 36 to its second position shown in Figure 24.

Upon being tripped, limit switch 36 causes fluid pressure to be directed to the smasher cylinders 25 in a direction to close the smashers. When the smashers engage the books under predetermined pressure, a third pressure-responsive switch is tripped by the back pressure from the smasher cylinders and this switch directs fluid pressure to the nipper cylinders 28 in a direction to open the nippers. When the nipper pistons engage their positive stops under back pressure, a fourth pressure-responsive switch is tripped, causing fluid pressure to be applied to the carriage cylinder in a direction to shift the carriage upstream back to its loading position, with the nippers open. At this point, dog 38 trips the switch arm 37 back to the position shown in Figure 21. This switch now causes the nippers to close and the smashers to open in sequence to repeat the cycle.

It will be understood at this point, that the nipper cylinders 28 are all connected in common to the source of fluid pressure by way of conduits (Figure 2), such that all of the nippers 20 apply equalized pressure simultaneously to the six books as it advances them. In like manner, the smasher cylinders 25 are all in common connection with conduits to provide equalized smashing pressure to the books during the upstream stroke of the carriage. The pressure-responsive switches, noted above, are adjustable as to pressure, such that precise nipping and smashing pressures, suitable for the characteristics of the various types of books, may be selected in a convenient manner.

It will be understood that the length of the carriage stroke is fixed and is equal to the center-to-center dimension of the smasher stations so as to accommodate books of maximum length. For this purpose, the carriage cylinder stops the piston at the stroke limits, as noted later. Since the cycles are initiated by this switch and thereafter are controlled by the pressure-responsive switches of the control unit, the apparatus is extremely simple, but positive in operation. It will also be understood at this point, that the control apparatus includes suitable metering valves which regulate the velocity of the carriage strokes and in this way, control the speed of the cycles and the duration of the smashing and nipping treatments.

*Conveyor and feed control mechanism*

Referring to Figures 1 and 2, conveyor 10 comprises a frame indicated generally at 60 which extends in cantilever fashion from the receiving or upstream end of the machine. Frame 60 is reinforced by a pair of inclined struts or braces 61—61. The conveyor is of conventional construction and the exact details are not completely illustrated.

In general, belt 12 is tracked upon a pair of pulleys 62 and 63, pulley 62 being in driving connection with conveyor motor 11 as indicated at 64 in Figure 16. The motor is mounted upon a platform 65 extending laterally from frame 60. The idler pulley 63 is loosely journalled within the outer end of frames 60, and includes the usual adjustment device for tightening the belt (not shown).

The conveyor belt 12 may be of fabric or other material suitable to slidably engage the rounded ends of the books according to conventional practice.

The conveyor passageway 14, previously noted, is delineated by a pair of vertical side plates 66 and 67 extending upwardly in a horizontal plane above frame 60 along opposite sides of the conveyor belt. The upper portions of these plates are flared outwardly as at 68 for convenience in feeding the books into the passageway 14 at the outer portion of the conveyor.

The book support plate 32 projects inwardly from the discharge end of the conveyor, the plate being attached as at 70 to the end wall 57 of the machine housing (Figure 2). Plate 32 thus forms an endwise extension of the conveyor belt, the driving pulley 62 being mounted adjacent the end of the support plate for direct passage of the books from the belt to the plate by operation of withdrawal plungers 34. The frame 60 of the conveyor is attached to end wall 57 by screws 71 as indicated in Figure 2.

In order to accommodate for the different thicknesses of books, the side plate 66 is attached directly to the frame 60 while the opposed side plate 67 is connected to and movable with the continuous presser plate 21. As noted earlier, presser plate 21 is shifted transversely to accommodate the thickness of the books by operation of a hand crank. Side plate 67 is attached to presser plate 21 by a rail 72 as indicated diagrammatically in Figures 16 to 18. As indicated in Figure 28, this rail or bar extends endwisely from the presser plate 21 and thus supports the shiftable side plate 67 substantially in flush relationship with plate 21. The conveyor passageway 14 is thus approximately equal in width to the machine passageway 15 and varies according to the adjustment of presser plate 21.

The feed mechanism 13 of the conveyor in general comprises a spring-loaded book arresting finger 73, a book release finger 74, and a pair of yieldable stop fingers 75—75 as indicated in Figures 16 to 18. The arresting finger 73 and release finger 74 are actuated by a rod 76 and coact with one another to release the books individually from the solid row A, the released book carried by the conveyor downstream to the stop fingers 75. The stop fingers hold the released book in a stationary position to be advanced by the withdrawal plungers 34 to the support plate 32 (Figure 16).

When the carriage reaches the loading position of Figure 16, a pad 77, which is carried by one of the loading nippers or jaws 33, engages the end of rod 76 and shifts the rod endwisely in the direction indicated by the arrow (Figure 16). This motion of the rod shifts the arresting finger 73 into frictional engagement with a book of row A, the book being temporarily clamped between finger 73 and conveyor side plate 66. At the same time, the release finger 74 is shifted by the rod to its release position, allowing the next book to advance toward yieldable stop fingers 75.

When the carriage shifts in the downstream direction, with the book B gripped between plungers 34, the spring loaded stop fingers 75 yield to allow the book to pass, then snap back to their stop positions as shown in Figure 17. As book B advances (Figure 17), the book D, which is upstream, follows book B but is stopped by the fingers 75. It will be noted in Figure 17, that the actuating rod 76 shifts in the direction indicated by the arrow as the carriage moves downstream, causing release finger 74 to shift to its second position in the path of the books on the conveyor, thus stopping the row A while the belt continues to advance. At this point, the arresting finger 73 is shifted to its second position out of engagement with the book. Upon the next loading stroke of the carriage, pad 77 again engages rod 76, causing finger 74 to release the next book of the solid row while finger 73 again engages the row. The fingers 73 and 74 thus segregate one book from the row upon each reciprocation of the carriage to its loading position and the stop fingers 75 locate the book in its proper longitudinal position for subsequent advancement through the smasher stations.

Described in detail with reference to Figures 26 to 28, the fingers 73 and 74 are carried by a mounting plate 78 which is attached by screws 80 to the conveyor side plate 66. Mounting plate 78 includes lugs 81—81 at opposite ends slidably supporting the actuating rod 76. The forward end of the rod includes a head 82 which is engaged by the carriage pad 77 as noted above. The rod is normally urged to the extended position shown in Figure 17 by a spring 83 confined in compression between head 82 and lug 81. A cushion spring 84 is interposed between the opposite side of lug 81 and is engaged by a collar 85 attached to the rod.

In the position shown in Figures 26 and 27, the rod 76 is in its right hand release position corresponding to Figure 16, with the carriage pad 77 depressing head 82 during the dwell period. In the arresting position (Figure 17), spring 83 forces the rod toward the left until collar 85 engages the cushion spring 84.

The arresting finger 73 comprises a generally L-shaped lever pivotally carried upon a pin 86. Pin 86 has its endwise portions mounted in lugs 87—87 projecting from mounting plate 78. The limb 88 of finger 73 carries on its outer or swinging end a cylindrical cup 90 in which is mounted a resilient friction button 91 formed of rubber or the like. The side plate 66 includes a clearance opening 89 allowing the friction button to pass through the plate into frictional engagement with the books.

The second limb 92 of finger 73 projects outwardly from pivot point 86 and includes a downwardly depending portion 93 which has its lower end portion confined between collars 94 and 95. Collar 94 is attached to rod 76 by a set screw and collar 95 is slidably mounted on the rod and is urged against lug 93 by a compression spring 96. Spring 96 has its outer end seated against collar 97 which is attached to the rod by a set screw. Spring 96 is preloaded by collar 97 when rod 76 is in its normal arresting position (Figure 17); when the rod is shifted to release position (Figures 26 and 27), button 91 first swings inwardly to frictionally engage the book, then continued movement of the rod toward the right swings the release finger 74 outwardly to its release position, compressing spring 96. Accordingly, the arresting finger 73 engages its book before the finger 74 releases the downstream book for advancement to the stop fingers 75.

The release finger 74 is pivotally mounted upon a pin 98 carried by the lugs 100—100 of mounting plate 78. A shank 101 extends in the downstream direction from pin 98 and includes at its outer or swinging end a right angular book abutment 102. The side plate 66 and mounting plate 78 include an opening 103 for passage therethrough of abutment 102. The finger 74 includes a limb 104 extending from its pivot pin and including a lug 105 projecting downwardly to a point above the rod 76. Collar 106, secured to the rod by a set screw engages lug 105. A tension spring 107 has one end anchored as at 108 to limb 104 and its opposite end anchored to a lug 110 projecting from mounting plate 78. The spring normally urges the book abutment 102 inwardly to its stopping position (Figure 17). Upon movement of rod 76 to the right, collar 106 engages lug 105, and thus shifts abutment 102 to the release position shown in Figures 26 and 27. As noted above, the abutment releases the book after the friction button 91 has shifted to engagement with its book.

Referring to Figures 28 to 30, the yieldable stop fingers 75—75 are mounted for swinging movement upon the conveyor side plates 66 and 67. One of the fingers is carried by the rail 72 which supports the shiftable side plate 67 and the opposed stop finger is mounted upon a bar 111 which is attached by screws to the fixed side plate 66. As viewed diagrammatically in Figure 17, rail 72 is provided with an elongated slot 112 and bar 111 on the opposite side is provided with a similar slot 112.

These slots allow the stop fingers 75 to be shifted longitudinally to accommodate for the length of the books. By way of example, the machine is shown set up for handling books which approach maximum length and consequently the fingers 75 are set near the downstream ends of the slots 112, such that the stop fingers provide a starting position which subsequently locates the books approximately at the longitudinal centers of the successive smasher stations. For the shorter books, the fingers are adjusted sufficiently in the upstream direction to cause the books to be fed with their longitudinal centers approximately coinciding with the longitudinal centers of the smashers.

The adjustable mounting structure is detailed in Figures 29 and 30 with reference to the adjustable rail 72 of side plate 67; however, it will be understood that the opposed finger is mounted on its bar 111 in the same manner. As shown in Figure 29, each finger 75 is attached to an actuating stem 114 which is journalled in a mounting block 113. The stem projects downwardly below the block and the finger 75 is secured to the stem by a set screw 115. The stem projects upwardly through slot 112 and upon its upper end there is welded a spring arm 116. A pin 117 projects upwardly from the outer portion of arm 116 and a spring 118 is anchored as at 119 to pin 117. Arm 116 is in bearing engagement with the upper face of rail 72 and thus supports stem 114 and fingers 75. The opposite end of each spring 118 is anchored to pins 120 projecting from the side plates as indicated in Figure 17.

The side plates each include an elongated opening 121, such that the inner portions of the stop fingers project inwardly in position to engage the books (Figure 28). The fingers are held in position against the tension of springs 118 by respective stop pins 122 which project downwardly from mounting blocks 113 (Figure 30).

Each mounting block 113 is adjustably clamped in position by a cap screw 123 having its lower portion threaded through block 113, its head engaging a washer 124 seated upon the upper surface of rail 72 (or bar 111), the shank of the screw passing downwardly through the slot. Upon loosening the cap screws 123, the assembly is free to be shifted longitudinally along the slots 112 to accommodate for the length of the books.

When the book, which engages the outer end portion of the opposed fingers, is withdrawn by the withdrawal plungers 34, the fingers swing in the direction indicated by the arrow in Figure 30, allowing the book to pass. The springs 118 provide sufficient tension normally to hold the book against the frictional force exerted by the advancing conveyor belt 12 upon which it rests. On the other hand, the springs permit the fingers to yield when the book is frictionally engaged by the plungers 34. After the trailing end of the book passes beyond the ends of the fingers, the springs, acting through the arms 116, snap the stem 118 and finger back against the stops 112 in position to stop the next book.

*Carriage and nippers*

Figure 15:
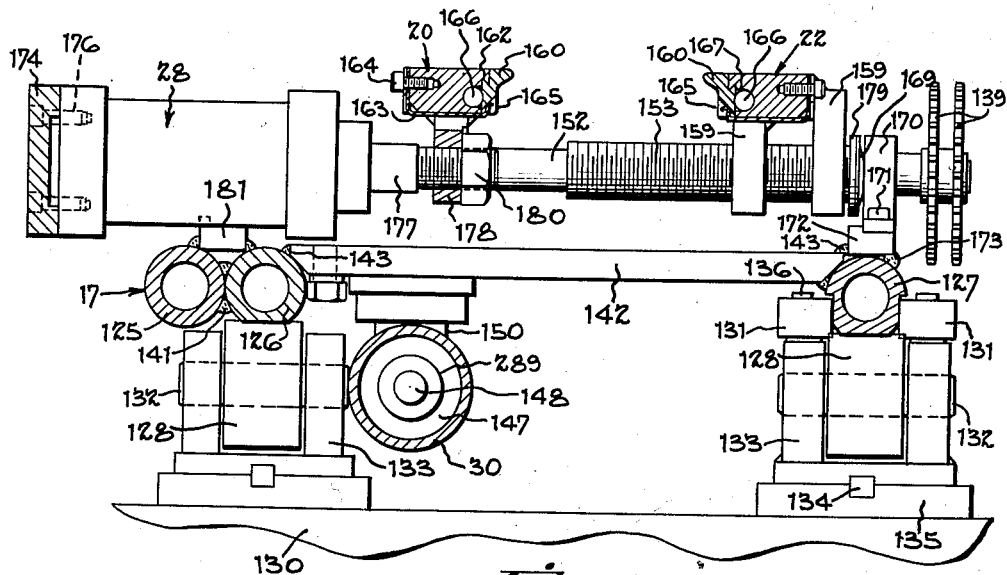
Figure 15 is a sectional view taken along line 15—15 of Figure 10, further illustrating the carriage and nipper construction.

Referring to Figures 14 and 15, the base of the reciprocating carriage 17 comprises the longitudinal tubular bars 125, 126 and 127, upon which the components are mounted. The bars 126 and 127 are mounted for reciprocation upon respective pairs of rollers 128—128 which are carried by cross members 130, consisting of I-beams supported by the standards 27 previously noted. The carriage is guided transversely by the rollers 131 which track against opposite sides of longitudinal bar 127 (Figure 14), the bar 127 being suitably configurated to provide flat tracking surfaces. As shown in Figure 2, two pairs of rollers 128 are provided, the transverse guide rollers 131 being in duplicate at opposite ends of the carriage.

Each longitudinal support roller 128 is journalled upon a bearing shaft 132, the shaft being mounted in a bracket 133. Each bracket is located transversely by a key 134 and is rigidly attached to a pad 135 which is carried by the cross member 130. The bracket 133 which supports right hand bar 127, includes a pair of stub shafts 136—136, the transverse guide rollers 131 being rotatably journalled on shafts 136.

Figure 10:
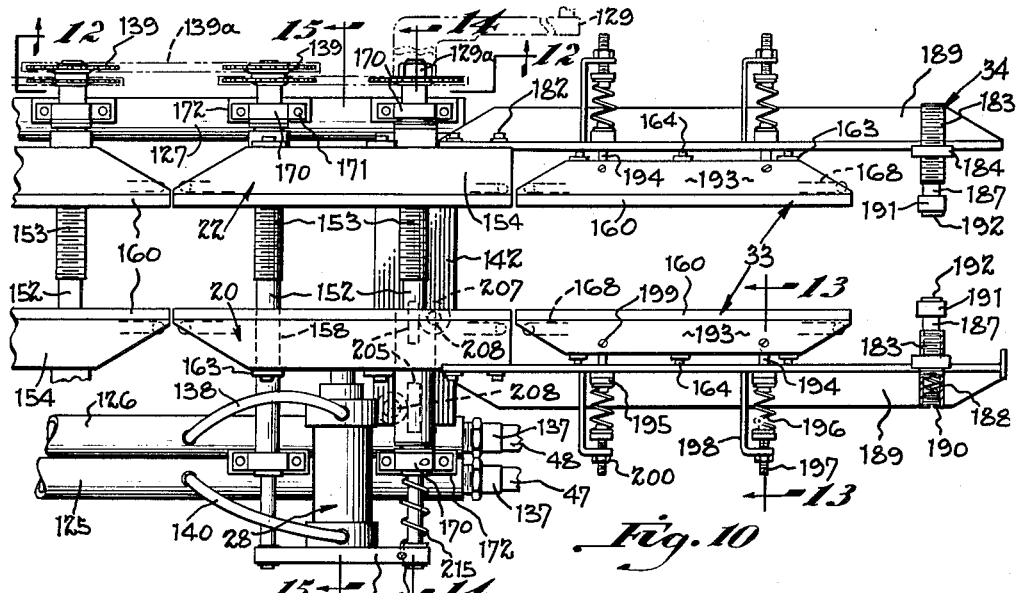
Figure 10 is a fragmentary top plan view of the receiving or loading portion of the carriage, showing the withdrawal plungers and loading nippers.
Figure 11:
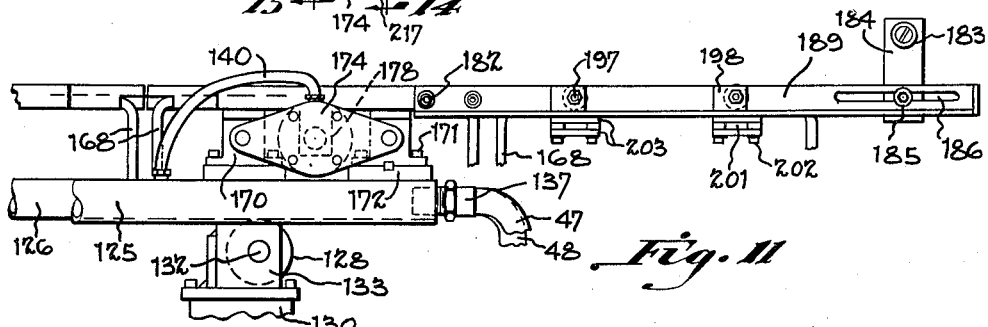
Figure 11 is a side elevation projected from Figure 10, further illustrating the loading portion of the carriage.

The left hand tubular bars 125 and 126 constitute fluid pressure manifolds, the flexible conduits 47 and 48, previously noted with reference to Figure 2, being connected as at 137—137 to the ends of the tubes (Figures 10 and 11). Fluid pressure is conducted from the manifold tubes 125 and 126 by flexible conduits 138 and 140 to the opposite end of each nipper cylinder 28. The opposite ends of the tubes 125 and 126 are sealed off and the two tubes are joined together by welding as indicated at 141.

The tubular bars 126 and 127 are rigidly joined together by cross plates 142 which have their opposite ends welded as at 143—143 to the spaced tubes. These plates are located at the opposite end portions of the carriage (Figure 10), although additional plates may be located at intermediate points along the carriage. It will be understood at this point, that each set of nippers constitutes a self-contained structure so arranged that the pressure developed by the nippers is not transmitted to the spaced bars 126 and 127.

The carriage cylinder 30 includes a cylinder head 144 (Figure 2) which is pivotally connected as at 145 to a plate 146 attached to the right hand cross member 130. The piston 147 (Figures 14 and 15) includes a piston rod 148, the outer end of which is attached to a block 150 welded as at 151 to the cross plate 142 at the downstream end of the carriage. Hydraulic fluid conducted by way of conduits 52 and 53 to the opposite sides of the piston thus reciprocates the carriage in forward and reverse directions, as noted earlier. The pivot connection 145 of the cylinder allows the cylinder to accommodate for any slight irregularities which may exist along the tubular carriage bars 125 and 127.

Figure 12:
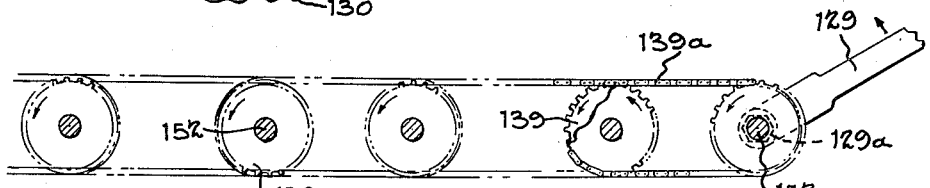
Figure 12 is a sectional view taken along line 12—12 of Figure 10, illustrating the sprocket and chain drive for adjusting the nippers transversely.

As best shown in Figure 10, each nipper 22 is shiftably mounted upon a pair of cross shafts 152—152 for transverse movement relative to its companion nipper 20. The cross shafts 152 are rotatably mounted on the carriage, and each includes a threaded portion 153 which supports the nipper 22. The shafts 152 are rotated in unison by the nipper adjusting crank 129 shown in broken lines, which fits the hexagonal nut 129a of the first shaft 152. As shown in Figure 12, each shaft has fixed on its end a pair of sprockets 139, the first shaft having a single sprocket which drives all of the shafts in unison. The sprockets are driven by individual sprocket chain runs indicated at 139a. Rotation of crank 129 thus shifts the nippers 22 transversely relative to the nippers 20 to vary the spacing between the opposed nippers according to the thickness of the books. The nipper 20, which is reciprocated by cylinder 28, is shown in its retracted or open position in Figure 14, its closed position in engagement with the book being indicated in broken lines in this view.

Described in detail (Figures 14 and 15), each shiftable nipper 20 comprises a nipper block 154 attached to a pad 155 which is welded as at 156 to a sleeve 157. The sleeve 157 is slidably mounted upon the cylindrical portion of one cross shaft of each pair. Each nipper 20 is provided with one sleeve 157, the opposite end portion of the nipper block 154 being slidably mounted directly on the cylindrical portion of the companion shaft as indicated at 158 (Figure 10). The sleeve guides the nipper assembly and prevents any binding action with respect to the cross shafts 152.

The nippers 22 also comprise respective nipper blocks 154, but in this case, each block includes a pair of lugs 159 welded to the nipper block at opposite end portions. These lugs are trapped and are in threaded engagement on the screw section 153 (Figure 14) of the cross shafts.

Each nipper block 154 carries a detachable jaw or insert 160, the outer working edge of which has a profile corresponding to the joint or crease line 161 (Figure 14) which is to be impressed in the book. Since various types of joints are required, the jaw 160 of each set of nippers 20 and 22 is demountably attached to the respective creaser blocks 154. The machine is furnished with several sets of interchangeable jaws 160, each jaw having a dove tail 162 (Figure 15) which interfits a dove tail way formed along the front face of the creaser block. The jaws are held in position in the creaser blocks by a series of leaf springs 163 attached by screws 164, the free end portion of the spring engaging the jaw as at 165, urging the jaw upwardly and holding its dove tail 162 in the dove tail way of the block. The several jaws 160 are removed conveniently simply by forcing the jaw downwardly a sufficient distance against the springs to disengage the dove tail 162. The new set of jaws is installed by forcing the springs downwardly with the lower edge of the jaw a sufficient distance to engage the dove tail, at which point the springs force the jaw upwardly to the position shown.

In order to crease covers permanently and to dry the adhesive quickly along the joints 161—161, each nipper jaw 160 is heated by an electrical heating element 166. Heating element 166 resides in an open groove 167 formed in the blocks 154—154 and in contact with the lower portion of the jaw which overlies the open slot. The heaters 166 are generally U-shaped and their endwise limbs 168 extend downwardly from the ends of the nipper blocks (Figure 11) to the carriage where they are connected to electrical feed cables (not shown). The feed cables are in the form of loops at the end of the carriage to avoid interference with its movement and are connected to a source of electrical energy.

The opposite ends of the cross shafts 152 are rotatably journalled in respective bearing lugs 170 (Figure 10) which are bolted as at 171 to respective mounting pads 172 which are welded as at 173 to the tubular bars of the carriage. As shown in Figure 14, the pads 172 at the left hand side of the carriage are welded in common to both tubes 125 and 126 while the right hand pads 172 are welded to the top of tube 127. The outer ends of each pair of cross shafts 152 are rigidly secured to the opposite ends of a cross head 174 by means of snap rings 175—175 which are engaged in grooves formed in the shaft in the conventional way. As shown in Figure 14, the snap rings 175 embrace the opposite sides of cross head 174.

The head end of the nipper cylinder 28 resides against the central portion of cross head 174 and is attached thereto by screw 176 (Figure 15). The piston rod 177 is threaded through a lug 178 which is welded to the lower surface of nipper block 154, the piston rod being locked by a nut 180 threaded on the rod and engaging lug 178. Cylinder 28 includes a mounting block 181 which is welded as indicated in Figure 15 to the tubes 125 and 126. This construction is duplicated for each set of nippers, there being provided five nipper cylinders as indicated in Figure 2.

As viewed in Figure 10, the nipper is closed by application of hydraulic pressure by way of conduit 140 to the head end of the cylinder, the fluid being exhausted from the opposite end by way of conduit 138. The piston and piston rod 177 forces the nipper to the position shown in broken lines in Figure 14, with the book gripped between the jaws 160—160 during the downstream advancement of the carriage, thus applying heat and pressure to the joints as the book is advanced.

It will be noted in Figure 10, that the cylinder 28 and its piston exerts a spreading action between cross head 174 and nipper bar 154 while the book is pressed between nippers 20 and 22. This force reacts in tension from jaw 22, through the cross shafts 152—152, and to the cross head 174, which is attached to the outer ends of the cross shafts. Accordingly, the mounting structure of the jaws completely isolates the gripping pressure from the tubular bars 125—127 of the carriage, as noted earlier.

As viewed in Figure 14, a pair of yieldable spring washers 169 is carried on each cross shaft 152, the washers being seated against bearing lugs 170—170 at opposite ends of the cross shafts. The left hand washer 169 is seated against the end of sleeve 157 and the right hand washer is seated against a rigid washer 179 which bears against a shoulder on the cross shaft. The spring washers 169 are fabricated from spring steel and are of a conventional type which is compressible under pressure. These washers allow the opposed nippers 20 and 23 to float laterally, within limits, when in pressure engagement against the joints of the book. Accordingly, when the book is engaged between the smashers, the floating nippers apply equalized pressure against opposite sides of the book.

As best shown in Figure 10, the withdrawal plungers 34 and loading nippers 33 are carried by a pair of angle irons 189—189 which project forwardly from the first set of nipper blocks 154, the angle irons being attached to the blocks as indicated at 182. The withdrawal plungers each comprise a tube 183 which is threaded through a lug 184 which is attached by a screw 185 passing through a longitudinal slot 186 (Figure 11). This arrangement permits the plungers to be adjusted longitudinally to accommodate for the length of the books as explained earlier with reference to the yieldable stop fingers 75. The threaded tubes 183 permit the spacing between the opposed plungers to be regulated to provide the required pressure engagement with the opposite sides of the book. It will be understood that the spacing of the plunger to accommodate the thickness of the books conforms to the transverse adjustment of the nippers 22 to which the angle iron 189 is attached.

Each withdrawal plunger includes a stem 187 slidably interfitting the tube 183, the stem being seated against a compression spring 188 having its opposite end bearing against a plug 190 threaded into the outer end of tube 183. The book-engaging end of stem 187 carries a cylindrical cup 191 in which is seated a friction button 192 formed of rubber or the like, similar to the arresting finger 73 previously described.

Figure 13:
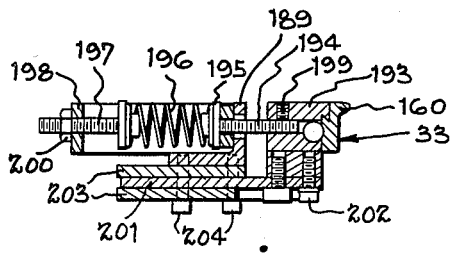
Figure 13 is an enlarged sectional view taken along line 13—13 of Figure 10, detailing the yieldable mounting of the loading nippers.

The loading nippers 33 each comprise a nipper block 193 similar to blocks 154, each block having a pair of stems 194—194 slidably passing outwardly through the angle iron which supports the block. As detailed in Figure 13, each stem 194 is threaded into block 193 and is locked by a set screw 199. The projecting end of stem 194 includes a head 195 seated upon a compression spring 196. A similar stem 197 is threaded through a bracket 198 which is rigidly attached to the angle iron 189. The stem is locked in adjusted position by a nut 200 with the spring 196 preloaded under compression. The loading jaws 33 thus are free to yield as the angle iron 189 moves inwardly to book-engaging position.

To prevent binding, each nipper jaw includes a guide bar 201 (Figures 11 and 13) attached as at 202 to the lower portion of nipper block 193 and passing slidably through a pair of spaced guide plates 203—203 attached as at 204 to the lower surface of angle iron 189. The loading nippers are provided with jaw inserts 160 demountably held in position by leaf springs 163, as described earlier.

In order to prevent binding of the shiftable nipper 20, which supports the movable loading nipper 33, the sleeve 157 of this nipper is provided with a pair of guide blocks 205 welded to the sleeve as at 206 (Figures 10 and 14). Rollers 207–207 are in bearing engagement against opposite sides of the guide blocks, the rollers being rotatably journalled on stub shafts 208. These shafts are threaded into the cross plate 142 and are locked in position by nuts 210—210.

The delivery jaws 35 (Figures 1 and 25) are carried by a pair of arms 211—211 which are attached to the last pair of nippers previously indicated at K. The delivery jaws 35 are yieldably mounted in blocks 219 which include internal compression springs (not shown), the action being similar to the yieldable loading nippers 33, described above. Jaws 35 also include demountable jaw inserts 160, as described above. In the loading position (Figure 1), the delivery jaws reside at the last smasher station J to engage the book therein. When the carriage shifts downstream (Figure 25), the jaws reside above the delivery chute 16 and thus open and release the book to the chute when the nippers open prior to advancement of the carriage back to loading position. The last nippers K may also be provided with guide blocks 205 and rollers 207 to overcome any binding effect created by the delivery jaws.

As viewed in Figures 1–3, discharge chute 16 is fabricated from sheet metal and is stiffened by side flanges 212—212, the right hand flange (Figure 2) being attached to the end wall 57. As viewed in Figure 3, the portion of the chute which resides below the delivery jaws is curved downwardly as at 213, the curved portion blending into a horizontal section 214, such that the books slide by gravity and are arrested gently on the horizontal portion 214 from which the finished books are removed.

In the preferred embodiment (Figure 14), the first set of nippers C and the last set K, are provided with tension springs 215 as shown in Figures 10 and 14. In each case, the spring 215 loosely encircles the cross shaft 152 which passes through sleeve 157.

The opposite end of each spring 215 includes straight limbs 216—216 (Figure 14). These limbs project into apertures formed in the bearing lug 170 and cross head 174. As indicated in Figure 10, the limbs are locked in their apertures by set screws 217.

Smasher mechanism

As shown in Figure 3, the continuous smasher plate 21 and movable smashers 18 are carried upon the upper ends of the standards 27—27, previously noted. The cross members 130, which support the carriage, are welded to the standards, the arrangement being such that the smashing pressure is resisted in tension by the cross members 130. The continuous presser 21 comprises a heavy steel plate which is stiffened longitudinally by a horizontal web 218 extending continuously along the length of plate 21 and welded to it as at 220. The opposite ends of plate 21 are supported for transverse adjustment by the brackets indicated generally at 221.

Described in detail, with reference to Figures 4–7, each bracket 221 comprises a pair of vertical side plates 222—222 having their lower edges welded to a base plate 223 which is attached by screws 224 (Figure 6) threaded into a support plate extending along the upper ends of standards 27 and welded thereto. As detailed in Figure 6, plate 21 is provided with a pair of threaded studs 225—225 at opposite ends, abutting the plate and attached to it as at 226. A respective nut 227 in the form of a rotatable sleeve is threaded upon each threaded stud 225 as at 228. Each nut 227 is rotatably journalled in the cylindrical bore of a bearing 230. As viewed in Figure 4, each bearing 230 includes endwise extensions 231—231 welded to the spaced side plates 222 as at 232, thus mounting the bearings rigidly in position.

The outer end of nut 227 includes a head 233 and the opposite end is provided with an adjustment sprocket 234. The sprocket is attached as at 235 to a mounting flange 236, the flange being keyed as at 237 to the end portion of the nut and held in position by a snap ring 239. The head 233 and flange 236 hold the nut endwisely in position within the bearing 230.

A sprocket chain 234a (Figure 5) is tracked upon the sprockets 234 for transverse adjustment of plate 21. It will be understood at this point, that sprocket chain 234a drives both sets of sprockets at opposite ends of plate 21 in the same direction, thereby rotating the nuts and shifting the plate transversely to accommodate for the thickness of the books. As viewed in Figure 6, plate 21 includes a shield 238 underlying top panel 58, the shield being attached as at 240 to the top edge of the plate 21.

The weight load of the continuous plate 21 is carried at opposite ends by pairs of rollers 241—241 journalled upon stub shafts 242 which are mounted in the side plates 222. A support bar 243 is tracked between the rollers, such that the major weight load of the assembled presser is carried by the lower roller, while the upper roller stabilizes the plate in its vertical plane. It will be noted in Figure 7, that the guide bar 243 is attached directly to the web 218 by screws 244. This structure is in duplicate at opposite ends of plate 21.

In order to eliminate back-lash in adjusting the presser plate, a tension spring 245 has its opposite ends anchored as at 246 and 247 to the side plate 222 and to the presser plate 21. The spring is pre-tensioned to draw the plate constantly toward the right, thus taking up any looseness which may exist in the screw threads and rotatable parts which adjust the plate.

The machine preferably includes a lubrication system for forcing lubricant to all bearings from a single source. A lubricant conduit 248, which forms a part of the system, as indicated in Figure 4, communicates with the bearing 230.

Figure 8:
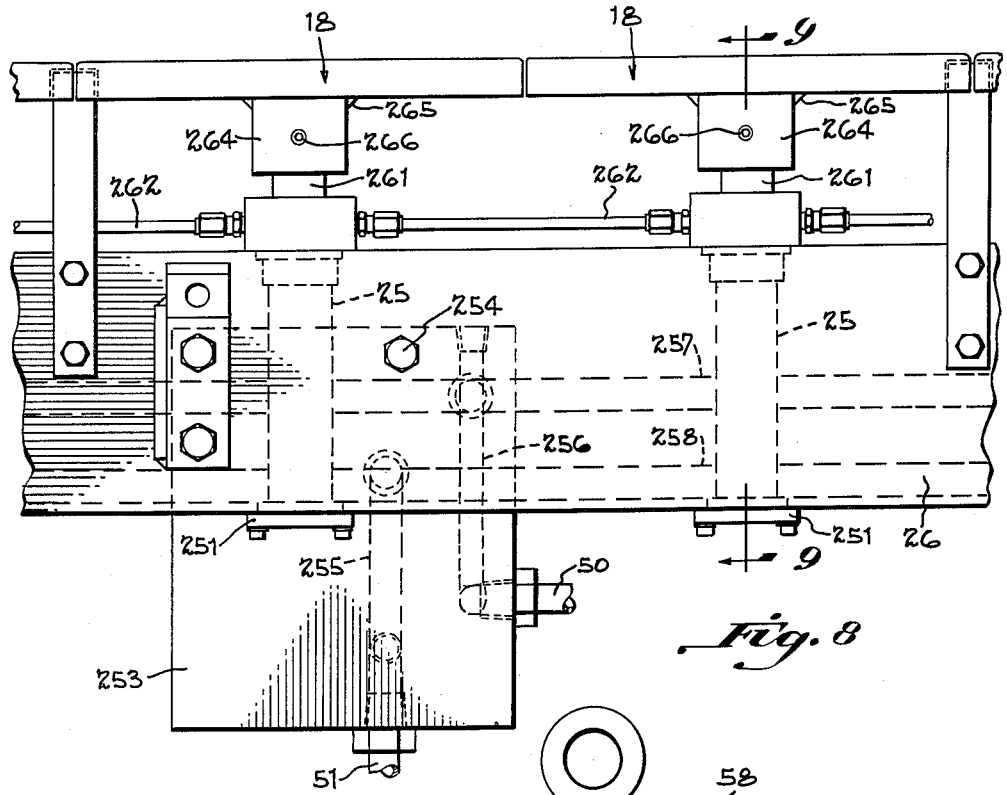
Figure 8 is a fragmentary top plan view illustrating the smashers and cylinder head which actuates them.
Figure 9:
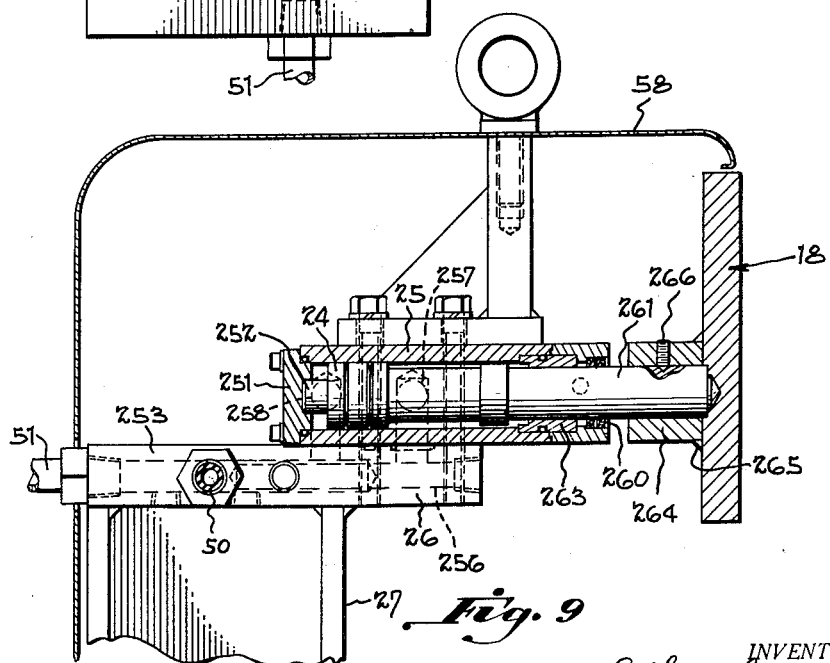
Figure 9 is a sectional view taken along line 9—9 of Figure 8, detailing one of the smashers.

As explained earlier, the smasher pistons 24 are carried in bores formed directly in the elongated cylinder block 26. This block, as shown in Figures 3, 8 and 9, is mounted upon the upper ends of the standards 27 which are provided with pads 250 for this purpose. As shown in Figures 1 and 9, each cylinder bore 25 is provided with a cylinder head 251 secured by screws to the block. The piston 24 includes an endwise cylindrical stud 252 which interfits a corresponding recess formed in the cylinder head. The stud creates a cushioning effect by virtue of the hydraulic fluid which is trapped in the recess as the piston approaches the outward limit of its stroke.

Hydraulic fluid is conducted to the cylinder bores 25 by way of a terminal block 253 which may reside at a point intermediate the length of the block (Figures 8 and 9). The terminal block is attached to the cylinder block by bolts 254. The fluid conduits 50 and 51, previously noted, are connected to respective bores 255 and 256 formed in the terminal block. These bores communicate with two longitudinal bores 257 and 258 machined in the cylinder block 26. The longitudinal bores 257 and 258, as viewed in Figure 9, communicate with the opposite sides of piston 24 and thus reciprocates the piston and smasher 18 in forward and reverse directions as the hydraulic fluid is alternately applied and exhausted relative to the conduits 50 and 51. The outer end of each cylinder bore is provided with seal rings 260 embracing the piston rod 261 and a leakage conduit 262 communicating with the bore adjacent the seal rings. These conduits lead back to reservoir 43 and carry away any hydraulic fluid which may escape past the seal 263 which also embraces the piston rod.

The outer end of piston rod 261 abuts the smasher plate 18. Each smasher plate includes a boss 264 welded as at 265 to the plate. The piston rod fits into the boss 264 and is secured in position by a set screw 266.

As best shown in Figures 4 and 5, smasher 21 is adjusted transversely by a hand crank 267 secured on a shaft 268 rotatably journalled in a pair of bearings 270—270 which are attached by screws 271 to one of the side plates 222 at the loading end of the machine. The inner end of shaft 268 carries a drive sprocket 273 which is attached to the shaft. Sprocket chain 234a, previously noted, is tracked over the sprockets 234—234 and across drive sprockets 273.

The sprocket chain 234a extends to the downstream end (Figure 3) and passes around the sprockets 234—234 in the same manner as Figure 5. Rotation of crank 267 thus rotates the pairs of threaded studs 225 at both ends of the machine in the same direction, thus shifting plate 21 and maintaining it in parallelism with the smashers 18.

The plate 21 is shown adjusted to its outward limit in Figure 6 as indicated by the arrow, thus delineating the passageway 15, as previously noted, which at this adjustment, is suited for books of maximum thickness. As indicated by the arrow in Figure 3, plate 21 is shown adjusted inwardly to accommodate books of an average thickness. In this view, smasher 18 is shown in its retracted position providing the clearance indicated at 274 for advancement of the book which is gripped between the nippers.

The clearance 274 is substantially less than the stroke of smasher piston 24, such that the smasher 18 moves from the position shown in full lines to the pressing position in broken lines (Figure 3) during the smashing cycle, thus pressing the book covers 275 in pressure engagement against the book filler 276 during the smasher dwell, while the open nippers are advancing back to the loading position.

Nipper 20 is shown in broken lines in its retracted or open position in Figure 3, the nipper clearance being indicated at 277. The stroke of the nipper piston is also substantially greater than the clearance 277. The stationary nipper 22 (Figure 3) is adjusted approximately to the position shown, with the jaw insert 160 projecting inwardly beyond the plane of presser plate 21.

For convenience in making the nipper adjustment, the nipper crank 129 may be mounted on the machine in a manner similar to the smasher crank 267 (Figure 4). However, in this case, the shaft (not shown) is shiftable endwisely and includes a socket which makes a detachable connection with the hexagonal nut 129a (Figure 10). The adjustment is made with the carriage stationary; after the nipper mechanism is adjusted, the shaft and its socket are retracted from the nut 129a to permit reciprocation of the carriage.

In the mass production of books, the page blocks or fillers 276 are assembled as one unit, and the covers 275, including the rounded end 23, are fabricated as a second unit. Liquid paste or glue is applied to the outside surfaces of the fillers including its rounded end surface. The fillers are then inserted into the covers, the assembled books then being ready for the pressing and creasing operations. Since the assembled books rest upon their rounded ends in the conveyor, the fillers are given an opportunity to settle down into the covers before being carried into the machine. Thereafter, the successive pressing operations compress the covers firmly against the fillers while the nippers form the creased joints, and in so doing, draw the rounded portion 23 of the cover firmly into contact with the rounded end of the filler.

In the present disclosure, only the nippers are heated since it is found that a good adhesive bond is obtained with the smashers operating at room temperatures. However, it will be understood that under certain operating conditions, if necessary, the smashers may be heated in the same manner as the nippers.

*Modified three-station machine*

Figure 31:
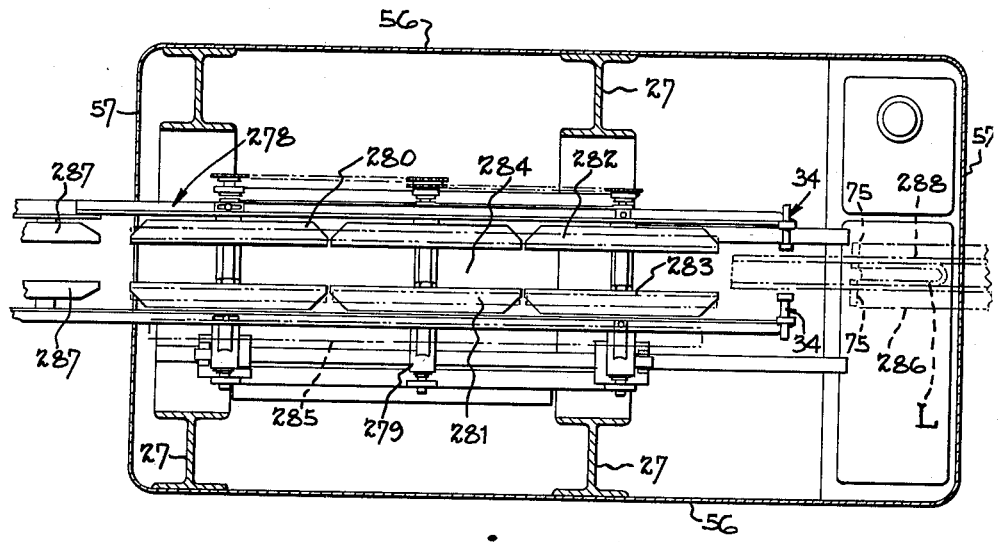
Figure 31 is a diagrammatic top plan view showing a simplified version of the pressing and creasing machine.

The modification shown in Figure 31 represents a simplified hand-fed machine, with the conveyor and feed mechanism omitted. Since this machine follows the principles disclosed above, it is illustrated in diagrammatic form with certain parts omitted. In general, it comprises a carriage indicated at 278 carrying a set of three nippers indicated at 280 and 281. The carriage includes a hydraulic cylinder for carriage reciprocation, and cylinders 279 for actuating the nippers 281, the structure being similar to that described above. The structure also includes adjusting means for adjusting the spacing of the nippers, as described above.

A continuous presser plate 282, indicated in broken lines, and shiftable smashers 283, also shown in broken lines, delineate a longitudinal passage 284. Presser 282 adjusted as described above and the smashers 283 are actuated hydraulically by the cylinder block indicated in broken lines at 285.

The books may be advanced manually to a support surface indicated at 286, which is provided with positioning stops such as yieldable fingers 75, indicated in broken lines. The upstream end of the carriage includes withdrawal plungers 34 which engage the books and advance them individually to the first and subsequent smashers 283.

The downstream end of the carriage includes delivery jaws 287. These jaws deliver the book to a delivery chute (not shown) when the jaws open. The carriage is shown in its downstream position in Figure 31 with a book L resting on the support surface and against the yieldable stops 75 in a position to be gripped by plungers 34 upon the next loading stroke of the carriage. The support surface is provided with side plates 288 for sustaining the book in its vertical position. After the book is advanced into the machine, it is subjected to three pressing and nipping operations during the sustained reciprocations of the carriage, the nippers and smashers being closed and opened by the hydraulic apparatus, as described above, to advance the books intermittently in a stream through the machine to the discharge chute.

*Hydraulic apparatus*

Figure 32:
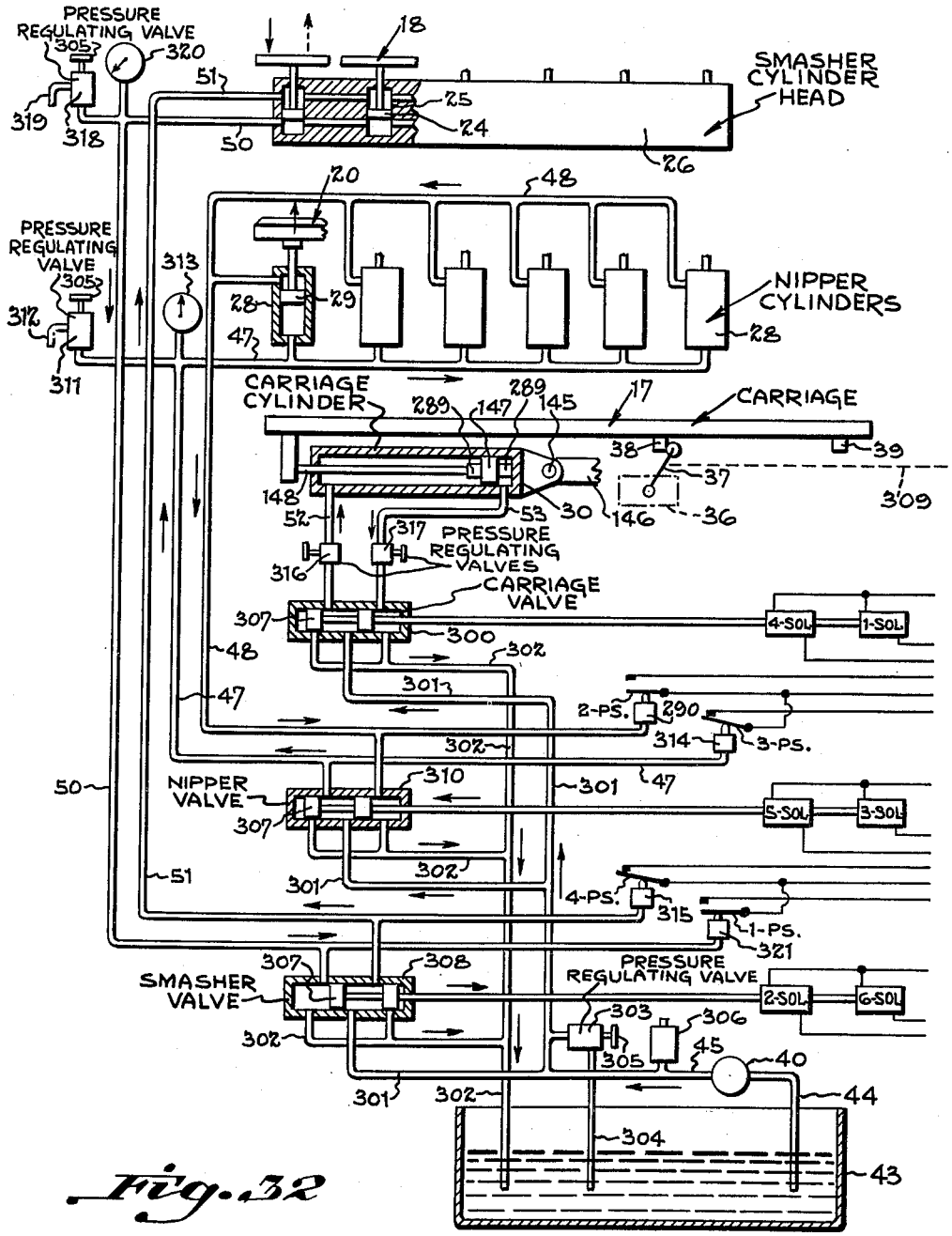
Figure 32 is a diagrammatic view illustrating the hydraulic apparatus.

The hydraulic system and electrical circuit (control unit 46, Figure 2), which regulate the reciprocation of the carriage and timed operation of the nippers and smashers, are shown diagrammatically in Figures 32 and 33. The hydraulic components are shown in the loading position, with the smashers 18 open and the nippers 20 closed. At this point in the cycle, the system is conditioned to shift the carriage from the retracted loading position in the book-advancing direction to its unloading position, as explained below.

In order to clarify the disclosure, the hydraulic system of Figure 32 includes the solenoids which actuate the reversing valves and the electrical contactors which are actuated by the pressure-responsive switches. These electrical components are also shown in the electrical circuit (Figure 33) to facilitate an understanding of the coaction between the hydraulic and electrical systems; the electrical components are identified by the same reference characters in the hydraulic and electrical systems. As noted earlier, the pressure-responsive switches of the hydraulic system close in response to back pressure of the nippers and smashers in their open and closed positions, and cause the carriage to be reciprocated in its upstream loading stroke or downstream unloading stroke.

As shown in Figure 32, hydraulic pressure is directed from the solenoid-operated carriage valve 300 (reversing valve) by way of the conduit 52 (Figure 2) to the left end of the carriage cylinder 30, the fluid being exhausted from the opposite end by way of conduit 53. As explained earlier, the hydraulic fluid is drawn by pump 40 from reservoir 43 by way of the intake conduit 44 and directed by way of conduit 45 to the pressure line 301 and exhaust line 302 by the control system during the cycles.

During the dwell period illustrated, the carriage is held in its loading position by hydraulic pressure which is bypassed through the pressure regulating valve 303 interconnected in pressure line 301. The piston 147 of the carriage cylinder includes positive stops 289—289 at opposite sides which engage the ends of the cylinder at the stroke limits. The by-passing fluid is exhausted by way of exhaust line 304 back to the reservoir 43. It will be understood at this point, that pressure regulating valve 303, and similar valves later described, are conventional structures and the exact details have therefore been omitted. These valves conventionally consists of a housing having a spring-loaded component which shifts in response to predetermined back pressure, allowing by-passing of the fluid back to the reservoir. Each valve includes means, such as a threaded adjustment handle 305, to regulate the by-pass pressure, the pressure line 301 also includes a conventional pressure accumulator 306.

The reversing valve 300, which is also conventional, is shifted in two positions by two solenoids which are indicated diagrammatically as 1–SOL and 4–SOL; in the position of the valve plunger 307 shown in the diagram, solenoid 4–SOL is energized. When solenoid 4–SOL is deenergized and solenoid 1–SOL is energized, the valve plunger shifts toward the right, corresponding to the illustrated position of reversing valve 308 which regulates the smashers, as explained later.

At the end of the loading dwell, as shown in Figure 32, the smashers 18 have been opened, the nippers 20 have been closed, and switch 36 has been tripped by dog 38 in the loading position of the carriage. The position of the components and direction of fluid flow, at this point in the cycle, is indicated by the arrows. The limit switch 36 includes several contacts interconnected in the electrical control system, as described later, these contacts being mechanically interconnected with switch arm 37 as indicated by the broken line 309.

During the dwell period, fluid pressure passes from pressure line 301 through nipper control valve 310 to line 47, holding the nippers 20 closed upon the books, the nipper cylinder 28 being exhausted by line 48 through nipper valve 310 to the exhaust line 302. When the nippers are closed as shown, back pressure develops in line 47 and acts upon the nipper pressure regulating valve 311, which communicates with line 47. The nipper pressure is selected by a regulating handle 305 as noted earlier. When predetermined back pressure is developed, valve 311 opens and by-passes the fluid by way of line 312 back to reservoir 43. A pressure gauge 313, of conventional design, also communicates with line 47. This gauge is mounted on the control panel 31 previously noted, and indicates the applied nipper pressure.

The pre-set nipper pressure developed in line 47 during the loading dwell, trips a pressure-responsive switch 314, communicating with line 47, to the position indicated. This switch is of conventional construction and includes an electrical contactor 3–PS which is shown in the diagram shifted to its closed position in response to the nipper back pressure. As shown in Figure 33, the closed contactor 3–PS has completed a circuit to solenoid 6–SOL of the smasher valve 308, shifting its plunger 307 in the direction indicated by the arrow to open the smashers. In this position (with the carriage still in loading position), hydraulic fluid is being directed from pressure line 301, through smasher valve 308 to line 51 leading to one end of the smasher cylinders 25, thus opening the smashers 18 as indicated by the arrow in full lines. During the opening motion of the smashers, fluid is exhausted from the opposite end of the smasher cylinders 25 by way of line 50, through smasher valve 308 and back to the sump by way of line 302.

The smasher line 51 includes a pressure-responsive valve 315 which closes its electrical contactor 4–PS when the smashers 18 are fully opened or retracted as shown. When contactor 4–PS is closed, the loading dwell period is ended and the carriage begins its advance downstream toward its unloading position. For this purpose, contactor 4–PS completes a circuit to solenoid 1–SOL of the carriage valve 300.

Upon being energized, this solenoid shifts the plunger 307 of the carriage valve 300 to its second position (opposite to that shown). In the second position, of valve 300, fluid pressure is directed from pressure line 301 through line 53 to the right hand end of carriage cylinder 30, causing the carriage piston 147 to be shifted toward the left (with the smashers open and nippers closed) until its stop 289 engages the left end of cylinder 30. At this point, dog 39 trips the arm 37 of switch 36 to its second position and the carriage dwells in its unloading position opposite to that shown in Figure 32.

In order to regulate the speed of carriage reciprocation, the conduits 52 and 53 of the carriage cylinder are provided with flow regulating valves indicated at 316 and 317. These valves are conventional and control the rate of flow in the direction indicated by the arrows. Each valve preferably includes a check valve providing free by-pass flow through the valve in the direction opposite to that indicated by the arrows, such that valve 316 controls the carriage speed toward loading position and valve 317 controls the speed in unloading direction.

When the carriage reaches its unloading position (with the nippers closed and smashers open), the contacts of switch 36 complete an electrical circuit to the solenoid 2–SOL of smasher valve 308, causing its valve plunger to be shifted to its second position opposite to that shown in Figure 32. Hydraulic pressure is now directed to smasher line 50, causing the smashers to close as indicated by the arrow in broken lines. During this motion, fluid pressure is exhausted from the smasher cylinders 25 by way of line 51. The carriage dwells in its unloading position during this phase of the cycle.

When the smashers are fully engaged against the books (which are still gripped by the nippers), a smasher pressure regulating valve 318 which communicates with line 50 opens at the adjusted pressure and by-passes by way of line 319 back to the reservoir. Smasher line 50 also includes a gauge 320 communicating with line 50 to indicate the adjusted smasher pressure.

With the smashers engaging the books, back pressure in line 50 acts upon a smasher pressure-responsive valve 321 communicating with line 50 and closing its contactor 1–PS. Since line 51 is now exhausting the fluid from the smasher cylinders, pressure-responsive valve 315 will have opened contactor 4–PS.

When the contactor 1–PS closes, it completes a circuit to solenoid 3–SOL of nipper valve 310, shifting the valve plunger 307 to a position opposite to that shown. At this point, fluid pressure is directed through the nipper valve 310 to line 48, thereby opening the nippers 20, the books now being firmly engaged by the smashers previously closed. As the nippers open, fluid is exhausted by way of line 47 through valve 310 to exhaust line 302. When the nippers are fully retracted or opened, back pressure develops in line 48, causing nipper responsive switch 290 to close its contactor 2–PS. Contactor 3–PS of nipper valve 314 now is open since line 47 acts as the exhaust line.

When nipper contactor 2–PS closes, it energizes solenoid 4–SOL of carriage valve 300, shifting its plunger 307 from its previous position back to the position shown in the diagram. Hydraulic fluid is now directed from valve 300 to line 52, causing carriage motion back to the loading position as shown (with the nippers open and smashers closed) until limit switch 36 is again tripped by dog 38.

The carriage now dwells at loading position (with the smashers closed) while the limit switch 36 contacts energize solenoid 5–SOL of nipper valve 310 (through closed contactor 1–PS) to shift valve 310 from it second position back to that shown in the diagram. Hydraulic pressure is now directed to line 47 to again close the nippers, as indicated, causing contactor 3–PS (pressure-responsive valve 314) to close, contactor 2–PS of valve 290 now being open as indicated. When nipper contactor 3–PS closes, the control circuit energizes solenoid 6–SOL of valve 308 to again open the smashers, as indicated, whereby pressure-responsive valve 315 closes its contact 4–PS to again reciprocate the carriage to its unloading position with the smashers open and nippers closed.

It will be seen from the foregoing, that the apparatus is positive in operation, since the reciprocation of the carriage from loading to unloading position depends upon the sequential closing of the nippers and opening of the smashers to permit the books to be advanced. In the same manner, at the unloading position, the carriage remains stationary until the smashers reengage the books under predetermined pressure, followed by the opening of the nippers until predetermined back pressure is developed in the open position, causing the carriage to retract back to loading position with the nippers open and the books firmly engaged by the smashers.

*Electrical circuit*

The electrical circuit shown in Figure 33, is powered by the A.C. three-phase lines 322 which energize the hydraulic pump motor 41 and conveyor motor 11. The power lines also energize the heating elements 166 of the nippers. The control circuit operates at a reduced voltage as provided by the transformer 323, according to conventional practice. The control circuit is thus provided by the feed lines 324 and 325.

The machine is set in operation by a main start switch 326 interposed in line 327 which extends from line 324 to a relay 1–M, the circuit being completed to line 325 from the opposite side of the relay. Relay 1–M includes a normally open holding contact 1–M in shunt line 328. When the main start button 326 is depressed, relay 1–M closes contact 1–M, thus completing the holding circuit. Contact 1–M also completes a circuit from line 324, line 328, through a selector switch 330, line 333, through a cycle stop switch 331 and through a cycle start switch 332.

Cycle starting switch 332, when depressed, completes a circuit by way of line 33 through relay 1–CR to line 325. Relay 1–CR actuates several normally open contacts 1–CR, one being interposed in shunt line 334. When cycle start switch 332 is depressed, relay 1–CR is energized, thus completing a holding circuit 334 after the start button 332 is released. The selector switch 330 provides automatic cyclic operation or manual control and is shown in automatic position. These several switches are mounted on the control panel 31 as previously noted.

When the main start switch 326 is depressed, relay 1–M also closes the normally open contacts 1–M in the power lines 322 to energize the pump motor 41 and conveyor motor 11. The nipper heaters 166 are controlled by a heater switch 329 in line 335 which energizes a relay CR–2. Relay CR–2 actuates contacts CR–2 interposed in the heater branch lines 336 as indicated in the diagram. After closing the main starting switch 326, cycle switch 332, selector switch 330, and heater switch 339, as shown in the diagram, the machine is ready for automatic operation.

As described above with the components positioned as in Figure 32, limit switch 36 will have tripped its two pairs of contacts 1–LS and 2–LS to the positions shown in the diagram. In this position, smasher contactor 1–PS is open in line 339 and smasher contactor 4–PS (smashers open) is closed in line 337. It will be noted that nipper contactor 3–PS (nipper closed) and 4–PS are in series in line 337 which leads to solenoid 1–SOL of carriage valve 300, thus energizing solenoid 1–SOL from line 324 to line 325. Line 337 also includes normally open contact 1–CR which is closed by relay 1–CR as previously noted.

Accordingly, as soon as the nippers sequentially are closed and the smashers opened as shown, the pressure-responsive contacts 3–PS and 4–PS energize solenoid 1–SOL, shifting the carriage valve 300 to the position opposite from that shown in the diagram. The carriage now shifts downstream toward unloading position. At this point, limit switch 36 is tripped by dog 39 to its second position closing its switch 2–LS in line 339 and contact 2–LS in line 338 (also opening contacts 1–LS in lines 340 and 341). Since nipper contactor 3–PS or line 337 is still closed, a circuit is established from feed line 324, line 337, contactor 3–PS, branch line 342, through closed contact CR–1 to branch line 338. The circuit is completed through the contact 2–LS of line 338 through solenoid 2–SOL (smasher valve 308) shifting the valve plunger from the position shown to the second position, causing the smashers to close.

At predetermined smasher pressure, smasher contactor 1–PS is closed under back pressure and 4–PS is opened. Accordingly, a circuit is completed from line 324, line 339, closed smasher contactor 1–PS, closed contactor 1–CR, limit switch contactor 2–LS (now closed) to solenoid 3–SOL to line 325. Upon being energized, 3–SOL shifts nipper valve 310 from the position shown to its second position, causing the nippers to open. When fully opened, back pressure from the nipper cylinders closes nipper contact 2–PS in line 343, the companion nipper contact 3–PS in line 337 being opened.

When nipper contact 2–PS closes in line 343 (nippers open) a circuit is completed from feed line 324, line 339, smasher contactor 1–PS (now closed), through solenoid 4–SOL of carriage valve 300. The valve now shifts back to the position shown, causing the carriage to shift back to loading position, with the smashers closed and nippers open. Dog 38 now shifts the pairs of limit contactors 1–LS and 2–LS back to the position shown in the diagram.

A circuit is thus completed from feed line 324, branch line 339, closed smasher contactor 1–PS (smashers closed) branch line 340, through closed contactor 1–LS and through solenoid 5–SOL of nipper valve 310, causing the nippers to close. At full nipper pressure, contactor 3–PS closes in line 337, thus energizing solenoid 1–SOL through smasher contactor 4–PS (smashers now open). Solenoid 1–SOL now shifts carriage valve 300 to the position shown, causing carriage motion to unloading position, as explained above.

The sustained operation of the components continues until the cycle stop button 331 (or main stop button, line 327) is depressed to deenergize the circuit.

To provide manual operation, as in setting up the machine for a given size and thickness of the book, the carriage, nippers and smashers may be actuated manually. For this purpose, the selector switch 330 is shifted to its second or manual position thus completing a circuit from feed line 324 to branch line 344. From branch line 344, a manually operated carriage advance switch is connected by way of line 345 to the solenoid 1–SOL. Upon depressing the retracting switch, solenoid 1–SOL is energized, causing the carriage to advance to unloading position. When the carriage retract switch is depressed, line 346 energizes solenoid 4–SOL causing carriage retracting motion to the loading position.

When the nipper open switch is depressed, line 347 energizes solenoid 3–SOL, which causes the nippers to open. When the nipper close switch is depressed, line 348 energizes solenoid 5–SOL causing the nippers to close.

When the open smasher switch is depressed, line 350 energizes solenoid 6–SOL to open the smashers. When smasher close switch is depressed, the circuit is completed by way of line 351 to solenoid 2–SOL and closes the smashers.

Each of these switches include a second interlock contact, normally closed, which leads to the opposed solenoid of each pair to prevent both solenoids of a given valve from being energized. For example, the carriage advance switch includes interlock contact 352 interposed in line 346 of the carriage retract switch. Thus, if the carriage advance and retract switches are both closed, line 346 will be deenergized by the interlock and only the advance solenoid 1–SOL will be energized.

It will be noted that the pressure-responsive switches and limit switch contacts complete the manual circuits, such that the timing is preserved during manual operation. For example, the smashers must be opened and the nippers closed before the carriage can be advanced from loading to unloading position under manual control.

Having described our invention, we claim:

1. A book pressing and creasing machine comprising, a machine frame having a loading and unloading end, book conveyor means residing at the loading end of the frame for advancing books individually toward said loading end, a carriage mounted on said frame for longitudinal reciprocating motion in forward and reverse directions relative to the loading and unloading ends of the frame, a plurality of opposed smasher elements residing longitudinally along said frame, said opposed smasher elements being relatively movable transversely to open or closed position, a plurality of opposed nipper elements mounted on said carriage, said nipper elements residing generally in parallelism with the opposed smasher elements, said nipper elements being relatively movable transversely to open or closed position, said nipper elements and smasher elements positioned relative to one another to receive books therebetween when in said open position and to impress the covers and joints of said books upon being moved to said closed position, said nipper elements movable longitudinally with the carriage relative to said smasher elements, actuating means for closing said nipper elements and opening said smasher elements during reciprocation of the carriage from said loading end toward the unloading end of the frame, said actuating means closing said smasher elements and opening the nipper elements during carriage reciprocation from the unloading end back to the loading end of the frame, said book conveyor means advancing a book to said open nipper elements when the carriage is at said loading end, said nippers impressing the joints of said book during reciprocation of the carriage and nippers toward the loading end of the machine frame, said nipper elements thereby advancing books to the loading end and discharging books from the unloading end after passage through the smasher elements during sustained reciprocation of the carriage and timed alternate opening and closing of the nipper elements and smasher elements.

2. A book pressing and creasing machine comprising, a machine frame having a loading and unloading end, book conveyor means residing at the unloading end of the frame for advancing books toward said loading end, a carriage mounted on said frame for longitudinal reciprocating motion to loading and unloading positions relative to the loading and unloading ends of the frame, opposed smasher elements extending longitudinally along said frame, said opposed smasher elements being relatively movable transversely to open or closed position, opposed nipper elements mounted on said carriage, said nipper elements residing generally in parallelism with the opposed smasher elements, said nipper elements being relatively movable transversely to open or closed position, said nipper elements and smasher elements positioned relative to one another to receive books when in said open position and to impress the covers and joints of said books upon movement to said closed position, said opposed nipper elements movable longitudinally with the carriage relative to said smasher elements, actuating means for reciprocating said carriage, and actuating means for closing the nipper elements and opening said smasher elements during reciprocation of the carriage from said loading position to the unloading position, said book conveyor means advancing books to said nipper elements when the nipper elements are open in the loading position of the carriage, said nipper elements engaging said books upon closing of the nipper elements and reciprocation of the carriage and nipper elements toward the unloading end of the machine frame, the nipper elements thereby advancing books into the said loading end and impressing the joints thereof during reciprocation of the carriage from the loading position toward the unloading position.

3. A book creasing and pressing machine comprising, a machine frame, a carriage mounted on said frame for longitudinal reciprocating movement to loading and unloading positions relative to said frame, opposed smasher elements residing longitudinally along said frame, said opposed smasher elements being relatively movable transversely to open or closed position, opposed nipper elements mounted on said carriage and movable longitudinally with the carriage relative to the smasher elements, said nipper elements movable transversely relative to one another to open or closed position, said opposed smasher elements and opposed nipper elements positioned relative to one another to receive books therebetween when in said open position and to impress the covers and joints of the books upon relative movement to said closed position, actuating means reciprocating the carriage and nipper elements longitudinally to said loading and unloading positions, actuating means for opening the smasher elements and closing the nipper elements during motion of the carriage from the said loading position, said actuating means closing said smasher elements and opening the nipper elements when the carriage advances to said unloading position, whereby reciprocation of the carriage and nipper elements advances a book between said smasher elements, said book being creased by said nipper elements during said advancement, said smasher elements pressing the book advanced therebetween by said nipper elements upon closing of the smasher elements.

4. In a book creasing and pressing machine, a machine frame, opposed smasher elements extending along said frame, said smasher elements being relatively movable transversely to open or closed position, a carriage mounted for longitudinal reciprocating motion relative to the frame, opposed nipper elements mounted on the carriage, said nipper elements residing generally in parallelism with the opposed smasher elements, said nipper elements being relatively movable transversely to open and closed position, said opposed smasher elements and opposed nipper elements positioned relative to one another to receive books therebetween when in said open position and to impress the covers and joints of the books upon relative movement to said closed position, said nipper elements movable longitudinally with the carriage relative to said smasher elements, actuating means for shifting said carriage and nipper elements longitudinally relative to said smasher elements, and actuating means for opening the smasher elements and closing the nipper elements during motion of the nipper elements longitudinally, said closed nipper elements thereby impressing the joints in the books and advancing the books longitudinally relative to the open smasher elements.

5. A machine for creasing and pressing books comprising, a machine frame having a loading end and an unloading end, a carriage mounted on said frame and movable longitudinally along said frame, power means connected to the carriage for shifting the same longitudinally to said loading and unloading positions, opposed smashers mounted in spaced relation to one another and residing longitudinally along said frame parallel with said carriage, said smashers being relatively movable transversely to open and closed position, opposed nippers mounted on said carriage and residing in parallelism with said smashers, said nippers being relatively movable transversely to open and closed position, the opposed smashers and nippers relatively positioned to receive a book therebetween when in said open position and to engage the covers and joints of said book upon movement to said closed position, respective power means connected to the smashers and nippers for shifting the same transversely to said open and closed positions, said nippers moving longitudinally with the carriage relative to the smashers during movement of the carriage to said loading and unloading positions, the power means of the nippers closing said nippers upon the joints of a book when said carriage is residing in said loading position, the power means of the smashers shifting said smashers to open position after the nippers have closed, the power means of the carriage thereafter shifting the carriage from said loading position to the unloading position, whereby the nippers impress the joints of the books and concurrently advance them toward said unloading end of the frame, said respective power means opening the nippers and closing the smashers when the carriage is in said unloading position, the power means of the carriage thereafter shifting the carriage back to said loading position with the nippers open and the smashers closed and impressing the covers of the book, whereby sustained reciprocation of the carriage and timed opening of the closing of the nippers and smashers is effective to advance a row of books in stepwise progression along said opposed smashers.

6. A book creasing and pressing machine comprising, a machine frame, opposed smashers spaced transversely apart from one another and extending longitudinally along said frame and having a loading and unloading end, said smashers being relatively movable transversely to open or closed position opposed nippers residing in parallelism with said smashers, said nippers being relatively movable transversely to open and closed position, said opposed smashers and nippers positioned relative to one another respectively to receive books therebetween when in said open position and to impress the joints of said books when moved to said closed position, said nippers movable longitudinally relative to the smashers, actuating means connected to said nippers for shifting the same longitudinally to said loading and unloading ends of the smashers, a smasher fluid pressure motor connected to the smashers for shifting the same to said open and closed positions, a nipper fluid pressure motor connected to said nippers for shifting the same transversely to said open and closed positions, said nipper motor closing said nippers when the nippers reach said loading end, pressure-regulating means communicating with the nipper motor and regulating the pressure of the nippers in said closed position, said nipper motor having pressure-responsive means communicating with the smasher motor, said smasher motor being energized in a direction to open said smashers in response to back pressure from the nipper motor after shifting the nippers to closed position, said actuating means shifting the nippers longitudinally toward said unloading end in response to shifting of the smashers to said open position with the nippers closed, whereby the joints of the books are impressed by the nippers while the book concurrently is advanced longitudinally relative to the open smashers toward the unloading end, the smasher motor closing said smashers after the closed nippers are advanced to said unloading end, said smasher motor having pressure regulating means communicating therewith and controlling the pressure of the smashers when in closed position engaging the covers of the books, whereby the pressure regulating means of the nipper and smasher motors regulate the pressure which is imposed upon the joints and covers of a book.

7. A book creasing and pressing machine comprising, a machine frame, opposed smashers spaced transversely apart from one another and extending longitudinally along said frame, and having a loading and unloading end, said smashers being relatively movable transversely to open or closed position, opposed nippers residing in parallelism with said smashers, said nippers being relatively movable transversely to open and closed position, said opposed smashers and nippers positioned relative to one another respectively to receive books therebetween when in said open position and to impress the joints of said books when moved to said closed position, said nippers movable longitudinally relative to the smashers, actuating means connected to said nippers for shifting the same longitudinally to said loading and unloading ends of the smashers, a smasher fluid pressure motor connected to the smashers for shifting the same to said open and closed positions, a nipper fluid pressure motor connected to said nippers for shifting the same transversely to said open and closed positions, said nipper motor closing said nippers with the nippers at said loading end, said nipper motor having pressure-responsive means communicating with the smasher motor, said smasher motor being energized in a direction to open said smashers in response to the nipper motor after shifting the nippers to closed position, said actuating means shifting the nippers longitudinally toward said unloading end in response to shifting of the smashers, to said open position, whereby the joints of the books are impressed by the nippers while the book concurrently is advanced longitudinally relative to the open smashers toward the unloading end, the smasher motor closing said smashers after the closed nippers are advanced to said unloading end, said smasher motor having pressure-regulating means communicating therewith and controlling the pressure of the smashers when in closed position engaging the covers of the books, whereby the pressure-responsive means of the smasher motor regulates the smasher pressure which is imposed upon the covers of the book.

8. A book creasing and pressing machine comprising, a machine frame, opposed smashers extending longitudinally along said frame and having book loading and unloading ends, said smashers presenting parallel flat surfaces and being relatively shiftable transversely to open or closed position, opposed nippers extending generally parallel with the opposed smashers along one edge thereof, said nippers being relatively movable transversely to open and closed position, said opposed smashers and nippers positioned relative to one another respectively to receive books therebetween when in said open position and to impress the joints and covers of said books when moved to said closed position, said nippers movable longitudinally relative to said smashers to loading and unloading positions, longitudinal actuating means connected to the nippers for shifting the ends of the nippers longitudinally beyond said loading and unloading ends of the smashers, nipper actuating means connected to said nippers for shifting the same transversely to said open and closed positions, smasher actuating means connected to said smashers for shifting the same to said open and closed positions, said actuating means opening said nippers and closing the smashers when the nippers are in said loading position, whereby the nippers engage the joint of a book advanced to the open nippers extending beyond said loading end of the smashers, said smasher actuating means opening the smashers after the nippers are closed, said longitudinal actuating means shifting the nippers longitudinally to said unloading position after the smashers open, whereby the joints of the book are impressed by said nippers while the book is advanced by the closed nippers relative to the open smashers, said smasher actuating means closing the smashers upon the book after the nippers advance the book to said unloading position, said nipper actuating means opening the nippers after the smashers close upon the book in said loading position of the nippers, the ends of the nippers which shift beyond the unloading end of the smashers advancing a finished book from the smashers, and upon opening, delivering the finished book by gravity.

9. A book pressing and creasing machine comprising, a machine frame, a carriage mounted for longitudinal motion on said frame, a carriage motor connected to the carriage for reciprocating the same longitudinally to loading and unloading positions, a series of shiftable smashers mounted upon said frame, an opposed fixed smasher opposite said shiftable smashers, said smashers having opposed parallel flat surfaces delineating a longitudinal book passageway having a loading and unloading end, smasher motors connected to said shiftable smashers for shifting the same transversely to open and closed positions relative to said fixed smashers, a plurality of pairs of opposed nippers mounted on said carriage and relatively movable transversely relative to said carriage to open and closed positions, said nippers residing along an edge of said opposed smashers, whereby the smashers and nippers are engageable respectively with the covers and joints of books residing in said book passageway upon being shifted to said closed position, said opposed nippers movable longitudinally with said carriage relative to the smashers, the length of the said carriage reciprocations being substantially equal to the center-to-center distance of the series of shiftable smashers, nipper motors connected to said nippers for shifting the same transversely to open and closed positions, said nipper motors and smasher motors closing the nippers and opening the smashers when the carriage is in said loading position, whereby the nippers impress the joints of a book advanced to said loading end, said carriage motor shifting the carriage longitudinally toward said unloading position with the nippers closed and smashers open, said smasher motor and nipper motors closing the smashers and opening the nippers when the carriage reaches said unloading position, said carriage motor thereafter shifting the carriage back to a loading position, said motors providing sustained reciprocation at the carriage and timed opening and closing the nippers and smashers, whereby a row of books is advanced in stepwise progression along said passageway from one shiftable smasher to the next upon each reciprocation of the carriage from said loading position to unloading position, the said row of books being alternately pressed and creased between the smashers and nippers during said stepwise progression.

10. In a book pressing and creasing machine having a loading and unloading end, a carriage including a loading end, said carriage reciprocating longitudinally to loading and unloading positions, and opposed nippers reciprocating with the carriage, said nippers being relatively shiftable transversely into engagement with the joints of books, said nippers impressing the joints and advancing the books through the machine, a book conveyor extending generally parallel with said carriage at the loading end thereof, said conveyor advancing a continuous row of books toward said loading end of the carriage, a shiftable book-arresting element normally residing in a book-engaging position in the path of said row of books and arresting the same on the conveyor, said book-arresting element reforming said books into a solid row upon said book conveyor, said arresting element residing upstream from the loading end of the carriage, actuating means connected to the book-arresting element for shifting the same to a disengaged position in response to movement of the carriage to said loading position, the arresting element thereupon releasing a book from the solid row on the conveyor and said conveyor advancing the book to the loading end of the carriage, the nippers at said loading end engaging the book and advancing the book into the loading end of the machine upon closing of the nippers and reciprocation of the carriage toward the said unloading position.

11. In a book pressing and creasing machine having a loading and unloading end, a carriage including a loading end, said carriage reciprocating longitudinally to loading and unloading positions, and opposed nippers reciprocating with the carriage, said opposed nippers being relatively shiftable transversely into engagement with the joints of books, said nippers impressing the joints and advancing the books through the machine, a book conveyor extending generally parallel with said carriage at the loading end thereof, said conveyor advancing a continuous row of books toward said loading end of the carriage, a shiftable book-arresting element normally residing in a book-engaging position in the path of said row of books and arresting the same on the conveyor, said book-arresting element reforming said books into a solid row upon said book conveyor, said arresting element residing upstream from the loading end of the carriage, a book release element residing downstream from the book arresting element and normally residing in a retracted position relative to said conveyor, and actuating means connected to said arresting and releasing elements, said actuating means being shifted by the carriage upon movement thereof to said loading position, said actuating means thereupon shifting said arresting element to a retracted position and shifting the release element to a book-engaging position, whereby the arresting finger releases a book from the solid row on the conveyor and said conveyor advances the book to said release element, said actuating means shifting the arresting element back to said book-engaging position and the release element to said retracted position upon movement of the carriage toward unloading position, the book arrested by said release element being engaged by the nippers at the loading end of the carriage and advanced into the loading end of the machine upon closing of the nippers and reciprocation of the carriage from said loading position.

12. In a book creasing and pressing machine, a machine frame, a carriage mounted on said frame for longitudinal reciprocating movement to loading and unloading positions relative to the frame, opposed sets of smashers residing longitudinally along said frame and spaced transversely from one another to receive a book therebetween, means mounting one set of smashers on said frame for transverse adjustment relative to the other set thereby to compensate for the thickness of a book to be engaged therebetween, said opposed sets of smashers being relatively movable transversely to an open or closed position, opposed sets of nippers, means mounting one set of nippers upon said carriage for transverse adjustment of said nippers relative to the other set to accommodate the thickness of a book disposed therebetween, said opposed nippers being relatively movable transversely to an open or closed position, said nippers movable longitudinally with the carriage relative to the smashers, said opposed smashers and nippers positioned relative to one another to receive books therebetween when in said open position and to impress the covers and joints of said books when moved to said closed position, actuating means for reciprocating said carriage and nippers longitudinally to said loading and unloading positions relative to the smashers, and actuating means for opening the smashers and closing the nippers upon motion of the carriage from said loading position toward the unloading position, said actuating means closing said smashers and opening the nippers when the carriage reaches said unloading position, whereby reciprocation of the carriage and closed nippers from the loading position advances a book longitudinally between said open smashers, said book being creased by said closed nippers during said reciprocation, said smashers pressing the covers of said book upon closing of the smashers after the book is advanced therebetween by said nippers.

13. In a book creasing and pressing machine, a machine frame, a carriage mounted on said frame for longitudinal reciprocating movement to loading and unloading positions relative to the frame, opposed sets of smashers residing longitudinally along said frame and spaced transversely from one another to receive a book therebetween, means mounting one set of smashers on said frame for transverse adjustment relative to the other set thereby to compensate for the thickness of a book to be engaged therebetween, said opposed smashers being relatively movable transversely to an open or closed position, opposed nippers mounted on said carriage and movable longitudinally with the carriage relative to the smashers, said opposed nippers being relatively movable transversely to an open or closed position, said opposed smashers and nippers positioned relative to one another respectively to receive books therebetween when in said open position and to impress the covers and joints of the books when moved to said closed position, actuating means for reciprocating said carriage and nippers longitudinally to said loading and unloading positions relative to the smashers, and actuating means for opening the smashers and closing the nippers upon motion of the carriage from said loading position toward the unloading position, said actuating means closing said smashers and opening the nippers when the carriage reaches said unloading position, whereby reciprocation of the carriage and closed nippers from the loading position advances a book between said smashers, said book being creased by said closed nippers during said reciprocation, said smashers pressing said book upon closing of the smashers after the book is advanced therebetween by said nippers.

14. In a book creasing and pressing machine having a frame and having opposed smasher elements residing longitudinally along said frame, said smasher elements being relatively movable transversely to open or closed position into pressing engagement with the covers of a book, means for advancing books stepwisely between said opposed smasher elements and for creasing the books during said advancement comprising, a carriage mounted on said frame for longitudinal reciprocating motion to loading and unloading positions relative to the frame, opposed nipper elements mounted on said carriage and movable longitudinally with the carriage relative to the smasher elements, said nipper elements movable transversely relative to one another from an open position to receive a book therebetween and to a closed position in pressure engagement with the joints of a book, respective jaw inserts mounted upon said opposed nipper elements and engageable with the joints of a book, means detachably mounting said jaw inserts on said nipper elements, said jaw inserts having opposed working edges which impress the profile of a joint into the book along opposite sides thereof, actuating means for reciprocating the carriage and nipper elements longitudinally to said loading and unloading position, and actuating means for closing the nipper elements during motion of the carriage from said loading position toward the unloading position, said actuating means opening the nipper elements when the carriage reaches said unloading position, whereby reciprocation of the carriage and nipper elements advances a book in stepwise fashion between said opposed smasher elements.

15. In a book creasing and pressing machine having a frame and having opposed smasher elements residing longitudinally along said frame, said smasher elements being relatively movable transversely to open or closed position into pressing engagement with the covers of a book, means for advancing books stepwisely between said opposed smasher elements and for creasing the books during said advancement comprising, a carriage mounted on said frame for longitudinal reciprocating motion to the loading and unloading positions relative to the frame, opposed nipper elements mounted on said carriage and movable longitudinally with the carriage relative to the smasher elements, said nipper elements movable transversely relative to one another to an open position to receive a book therebetween and to a closed position in pressure engagement with the joints of a book, respective jaw inserts mounted upon said opposed nippers and engageable with the joints of a book, each of said nipper elements having a recess along one face thereof, each of said jaw inserts having an edge portion detachably seated to said recess of the nipper element, spring means urging said jaw insert into said recess, said spring means yielding and providing withdrawal of the jaw insert from the recess, said jaw inserts having opposed working edges which impress the profile of a joint into the book, actuating means for reciprocating the carriage and nipper elements longitudinally to said loading and unloading position, and actuating means for closing the nipper elements during motion of the carriage from said loading position toward the unloading position, said actuating means opening the nipper elements when the carriage reaches said unloading position, whereby reciprocation of the carriage and nipper elements advances a book in stepwise fashion between said opposed smasher elements.

16. In a book creasing and pressing machine having a frame and having opposed smashers residing longitudinally along said frame, said smasher being relatively movable transversely to open or closed position, said smashers pressing the covers of a book disposed therebetween when in said closed position, means for advancing a book in stepwise fashion longitudinally between said smashers comprising, a carriage mounted on said frame for longitudinal reciprocating motion to loading and unloading positions, said carriage having a pair of tubular members extending longitudinally thereof and in bearing engagement with said frame, a plurality of pairs of opposed nippers mounted on said carriage and movable longitudinally with the carriage relative to the opposed smashers, said opposed nippers being relatively movable transversely to an open or closed position upon said carriage, said smashers and nippers positioned relative to one another to receive books therebetween when in said open position and to impress the covers and joints of said books upon movement to said closed position, a plurality of fluid pressure cylinders mounted on said carriage, one for each pair of opposed nippers, fluid pressure and exhaust means connecting the tubular members of the carriage with the opposite ends of said cylinders, each of said cylinders connected to one nipper of a pair and having a piston connected to the opposed nipper for shifting the same to open or closed position, and timing means directing fluid pressure alternately to said tubular members, said timing means closing said nippers during motion of the carriage from said loading position, said timing means opening said nippers when the carriage reaches said unloading position, whereby reciprocation of the carriage and timed closing and opening of the nippers advances a book in stepwise fashion between said smashers, the joints of said book being creased by said nippers during said advancement of the book.

17. In a book creasing and pressing machine having a frame and having opposed smashers residing longitudinally along said frame said smashers being relatively movable transversely to open or closed position, said smashers pressing the covers of a book disposed therebetween when in said closed position, means for advancing a book in stepwise fashion longitudinally between said smashers comprising, a carriage mounted on said frame for longitudinal reciprocating motion to loading and unloading positions, a plurality of pairs of opposed nippers mounted on said carriage and movable longitudinally with the carriage relative to the opposed smashers, said pairs of opposed nippers being relatively movable transversely to an open or closed position, said opposed smashers and nippers positioned relative to one another to receive books therebetween when in said open position and to impress the covers and joints of books disposed therebetween upon movement to said closed position, a plurality of fluid pressure cylinders mounted on said carriage, one for each pair of opposed nippers, each cylinder having a piston therein, fluid pressure and exhaust means in communication with opposite ends of said cylinders, actuating means connecting each cylinder and piston to the opposed nippers of a pair and shifting the same to open or closed position, yieldable means interposed between said actuating means and opposed nippers, and timing means directing fluid pressure alternately to the opposite ends of the cylinders, said timing means closing said nippers during motion of the carriage from said loading position and opening said nippers when the carriage reaches said unloading position, whereby reciprocation of the carriage and timed closing and opening of the nippers advances a book in stepwise fashion between said smasher elements, said book being creased by said nippers during said advancement of the book by the nippers, the pressure of each pair of nippers when closed upon a book being resisted by said actuating means and isolated from the carriage, the said yieldable means providing lateral floating of the opposed nippers whereby said crease is impressed substantially to an equal depth along opposite sides of the book.

18. A book pressing and creasing machine comprising, a machine frame having a loading and unloading station, a plurality of opposed smashers spaced transversely apart from one another and residing in series relative to said frame, said smashers being relatively movable transversely to open and closed position, a plurality of opposed nippers residing in parallelism with said smashers, said nippers being relatively movable transversely to open and closed position, said opposed smashers and nippers positioned relative to one another respectively to receive books therebetween when in said open position and to press the covers and crease the joints of the books when moved to said closed position, said nippers and smashers being movable in forward and reverse carrier directions relative to one another, power means for alternately closing the smashers and opening the nippers and for opening the smashers and closing the nippers, and power means for imparting said relative carrier motion to the smashers and nippers in one direction when the nippers are closed and in the opposite direction when the nippers are open, whereby the smashers and nippers press the covers, crease the joints,while advancing the books from the loading station of the machine toward the unloading station.

19. A book pressing and creasing machine comprising, a machine frame having a loading and unloading station, a plurality of opposed smashers spaced transversely apart from one another and residing in series relative to said frame, said smashers being relatively movable transversely to open and closed position, a plurality of opposed nippers residing in parallelism with said smashers, said nippers being relatively movable transversely to open and closed position, said opposed smashers and nippers positioned relative to one another respectively to receive books therebetween when in said open position and to press the covers and crease the joints of the books when moved to said closed position, said nippers and smashers being movable in forward and reverse carrier directions relative to one another, a first actuating means for imparting said relative forward and reverse carrier movements to the smashers and nippers, a second actuating means for shifting the smashers transversely to said open and closed positions, a third actuating means for shifting the nippers transversely to said open and closed position, said second and third actuating means opening the smashers when the nippers are closed and closing the smashers when the nippers are opened, said first actuating means imparting the said relative carirer motion to the smashers and nippers in one direction when said nippers are closed and in the opposite direction when the nippers are open, whereby the smashers and nippers press the covers and crease the joints while advancing the books from the loading station of the machine toward the unloading station.

References Cited in the file of this patent

UNITED STATES PATENTS

| | | |
|---|---|---|
| 2,151,957 | Davis | Mar. 28, 1939 |
| 2,151,991 | Schramm | Mar. 28, 1939 |
| 2,635,262 | Schramm | Apr. 21, 1953 |
| 2,636,195 | Hicks et al. | Apr. 28, 1953 |
| 2,718,018 | Hildman | Sept. 20, 1955 |